United States Patent
Bergan et al.

(10) Patent No.: US 12,092,400 B2
(45) Date of Patent: Sep. 17, 2024

(54) MODULAR THERMAL ENERGY STORAGE SYSTEM, IMPROVED METHOD OF OPERATION OF SUCH SYSTEMS AND USE OF THE THERMAL ENERGY STORAGE SYSTEM

(71) Applicant: EnergyNest AS, Billingstad (NO)

(72) Inventors: Pål G. Bergan, Nesøya (NO); Christopher Greiner, Vøyenenga (NO); Nils Høivik, Nesøya (NO)

(73) Assignee: EnergyNest AS, Billingstad (NO)

( * ) Notice: Subject to any disclaimer, the term of this patent is extended or adjusted under 35 U.S.C. 154(b) by 152 days.

(21) Appl. No.: 16/769,556

(22) PCT Filed: Dec. 5, 2018

(86) PCT No.: PCT/EP2018/083636
§ 371 (c)(1),
(2) Date: Jun. 3, 2020

(87) PCT Pub. No.: WO2019/110655
PCT Pub. Date: Jun. 13, 2019

(65) Prior Publication Data
US 2021/0172685 A1    Jun. 10, 2021

(30) Foreign Application Priority Data
Dec. 5, 2017   (NO) .................................. 20171937

(51) Int. Cl.
  *F28D 20/00*    (2006.01)
  *F28D 19/00*    (2006.01)
  *F28D 20/02*    (2006.01)

(52) U.S. Cl.
  CPC ......... *F28D 20/0056* (2013.01); *F28D 19/00* (2013.01); *F28D 20/028* (2013.01);
  (Continued)

(58) Field of Classification Search
  CPC ............... F28D 20/0056; F28D 20/028; F28D 2020/0078; F28D 2020/0082; F28D 20/00;
  (Continued)

(56) References Cited

U.S. PATENT DOCUMENTS 4,291,750 A * 9/1981 Clyne ..................... F28D 20/02
                                                        165/104.11
4,524,756 A * 6/1985 Laverman ........... F28D 20/0056
                                                        126/400
(Continued)

FOREIGN PATENT DOCUMENTS

EP   2525051 A1   11/2012
GB   2459955 A    11/2009
(Continued)

OTHER PUBLICATIONS

Bauer et al., Thermal energy storage materials and systems, 2012, Annual Review of Heat Transfer, vol. 15, p. 131-177 (Year: 2012).*
(Continued)

*Primary Examiner* — Travis Ruby
(74) *Attorney, Agent, or Firm* — LLP Bradley Arant Boult Cummings LLP

(57) ABSTRACT

Thermal energy storage ("TES") includes at least two blocks or zones operated with respect to charging and discharging of thermal energy by flowing a heat transfer fluid ("HTF") through the block or zone; an inlet charging manifold, an outlet charging manifold, an inlet pipe arranged from the inlet charging manifold to each block or zone; an outlet from each block or zone; and one or more of the valves: a flow control valve ($v_{i1}$; $v_{a1}$, ... $v_{e1}$) arranged in at least one of block or zone inlet pipes, inlets, outlets and outlet pipes, for control of flow through the block or zone, a bypass valve ($v_{i2}$; $v_{a2}$, ... $v_{e2}$) arranged in inlet charging side pipe
(Continued)

sections between inlet pipe and serial flow return for the block or zone, for bypassing flow and serial flow control.

15 Claims, 23 Drawing Sheets

(52) U.S. Cl.
CPC ............... *F28D 2020/0078* (2013.01); *F28D 2020/0082* (2013.01)

(58) Field of Classification Search
CPC .... F28D 20/02; F28D 20/0034; F28D 20/021; F28D 19/00; F28D 1/0477; F28D 1/0475; F28D 2020/0021; F28D 2020/0069
See application file for complete search history.

(56) References Cited

U.S. PATENT DOCUMENTS

| | | | | |
|---|---|---|---|---|
| 6,101,821 | A * | 8/2000 | Cates | F28D 7/085 62/139 |
| 6,789,608 | B1 * | 9/2004 | Wiggs | F24T 10/15 165/45 |
| 2008/0022685 | A1 | 1/2008 | Zhu | |
| 2008/0066736 | A1 | 3/2008 | Zhu | |
| 2008/0219651 | A1 * | 9/2008 | Nayef | F28D 20/0056 392/485 |
| 2010/0281889 | A1 * | 11/2010 | Reich | F28D 20/021 700/275 |
| 2011/0017196 | A1 * | 1/2011 | Bell | F24H 1/208 126/400 |
| 2011/0286724 | A1 * | 11/2011 | Goodman | F28D 20/0056 165/104.31 |
| 2012/0055661 | A1 * | 3/2012 | Feher | F28D 20/021 165/181 |
| 2013/0240171 | A1 * | 9/2013 | Morgan | F28F 27/02 165/10 |
| 2014/0008033 | A1 * | 1/2014 | Howes | F28F 13/06 165/10 |
| 2014/0060046 | A1 * | 3/2014 | Takahashi | F28D 20/023 126/618 |
| 2014/0110080 | A1 * | 4/2014 | Bergan | F24S 60/30 165/10 |
| 2014/0299306 | A1 * | 10/2014 | Bindra | B01J 19/0006 165/200 |
| 2015/0027122 | A1 * | 1/2015 | Brunhuber | F28D 20/02 60/659 |
| 2016/0320145 | A1 * | 11/2016 | Bergan | F28D 20/0056 |
| 2017/0363368 | A1 * | 12/2017 | Bergan | F28D 20/0056 |

FOREIGN PATENT DOCUMENTS

| | | | | |
|---|---|---|---|---|
| NO | 332707 | B1 | 12/2012 | |
| NO | 20131725 | A1 * | 6/2015 | ............. F28D 20/00 |
| NO | 337357 | B1 | 3/2016 | |
| NO | 20141540 | A1 | 6/2016 | |
| NO | 20141546 | A1 | 6/2016 | |
| NO | 339848 | B1 | 2/2017 | |
| NO | 339948 | B1 | 2/2017 | |
| NO | 339952 | B1 | 2/2017 | |
| NO | 340371 | B1 | 4/2017 | |
| WO | WO-2017151606 | A1 * | 9/2017 | ............. F28D 17/04 |

OTHER PUBLICATIONS

Louchet, Nicolas; International Search Report; PCT/EP2018/083636; Mar. 28, 2019; 4 pages.

* cited by examiner

Fig 21 Combined system

MODULAR THERMAL ENERGY STORAGE SYSTEM, IMPROVED METHOD OF OPERATION OF SUCH SYSTEMS AND USE OF THE THERMAL ENERGY STORAGE SYSTEM

FIELD OF INVENTION

The present invention relates to enhancing the overall performance of thermal energy storages (TES). More specifically, the invention relates to modular thermal energy storages, for which heat is transferred in and out of the storage by means of a heat transfer fluid (HTF) that flows through a piping system, parts of which is positioned within thermal elements and parts of which is positioned on the outside of the elements. Said elements preferably comprise a suitable solid-state material, such as special type of concrete, with properties serving the purpose of efficient transfer and storage of heat. In some embodiments, the invention relates to patents that describe such technology, however, in other embodiments the invention relates to thermal energy storages of other types. Many previous patents describe design and physical properties of thermal energy storages, TES, in various embodiments. The present invention provides TES system designs and methods of operation to enhance the overall TES capacity, efficiency and rate of thermal energy charge and discharge, by way of expanding the dynamic temperature range, maintaining stable temperature of the HTF, increasing versatility of operation and reducing size and thereby cost.

Background of Invention and Prior Art

Whereas electrochemical batteries serve the purpose of storing and delivering electricity, TES serves the purpose of storing and delivering thermal energy. Thermal energy can then be used directly as e.g. process heat (typically steam) or converted to electricity via a turbine-generator. There are many applications for TES; one such is concentrated solar power (CSP) where surplus thermal energy captured during sunshine hours can be stored and later discharged to maintain power generation after sunset. Other applications can be found in energy intensive industries, such as metal- and chemical industry, where large amounts of heat is discarded typically because the temperature has dropped below the temperature required in the process, and the energy cannot be reintegrated in another downstream process. The latter may often be caused by the cyclic nature of the waste heat due to the process itself (e.g. batch process). In such case, TES can stabilize fluctuations and store energy over longer time periods, enabling on-demand delivery of heat to other processes, or conversion to electricity and low temperature heat via a turbine-generator. A TES may also be integrated directly in the steam cycle of a steam-electric thermal power plant (coal, gas, oil, nuclear, biomass) to improve the power plants flexibility in terms of increasing ramp rates and increasing the bandwidth of power output, both reducing the minimum output and increasing the maximum output. It may also enable less costly and energy-intensive starting and stopping of the plant. Increased flexibility of thermal power plants enables the integration of more intermittent and variable renewable energy such as wind- and solar photovoltaics; a TES may thus be an attractive alternative to "conventional" electric energy storage via electrochemical batteries, pumped hydro storage or compressed air energy storage. A TES may also be charged directly with electricity (by way of electrically heating the HTF), which may be attractive in cases of significant surplus electricity that may otherwise be discarded. The stored energy can then be reconverted to electricity and low temperature heat or made available for production of e.g. industrial process steam. There are innumerable cases for which TES can create great economic value and contribute towards higher energy efficiency and better environmental performance of the energy systems.

A series of previous patents, inter alia NO 332707, NO 337357, NO 339848, NO 339952, and NO 340371, describe a modular, solid state, thermal energy storage technology, methods for building such storage, and utilizing such storage in a system context. This technology has been tested and proven through long-term operation of a pilot storage in Abu Dhabi, UAE with excellent results. Many different applications of this technology are expected to be implemented in the years to come. Typical energy storage capacity of a TES may range from 10 MWh to several GWh. Clearly, very large amounts of energy can be stored and, accordingly, such storage can be large and costly. It is thus clear that improvements of existing technology with respect to enhancement of storage capacity, efficiency and quality of heat will have great value.

Therefore, a demand exists for improvements of existing TES technology. The basis for this is that, for instance, thermal energy can be stored at high temperature in a solid state thermal element as exemplified in FIG. 1, which relates to NO 339848. Heat is transferred to and from the element by means of a HTF that runs through a system of integrated steel pipe heat exchangers, as indicated by two U-loops in parallel as shown in FIG. 1, and the storage of energy mainly takes place in a solid or a concrete-like material that surrounds the heat exchangers within a cylindrical casing of thin steel. As described in NO 340371, thermal elements can be connected and bundled together in a cassette which in turn may be stacked on top of each other and placed side by side to provide a modular storage of any size needed, see FIG. 2. However, the current invention does not only relate to such specific design of thermal energy storage; it may equally well be applied in connection for other TES type solutions, such as solutions described in NO 339952 where the HTF flows on the outside of the thermal elements, see FIG. 3. A storage may have several such containments with many thermal storage elements inside. The present invention provides enhanced overall thermal energy capacity and performance. It is also to be noted that in one embodiment of invention of NO 339952 the charging of the storage may be flow of one HTF, for instance hot flue gas, on the outside of the elements, while the discharge of heat is via a second HTF such as thermal oil, which flows through cast-in heat exchangers within the thermal elements. The invention does in general also apply to other forms of modular TES solutions.

SUMMARY OF THE INVENTION

The present invention is as defined in the independent claims, to which reference is made. Preferable embodiments are defined in dependent claims, to which reference is made.

More specifically, the invention provides a thermal energy storage—TES—comprising: at least two blocks or zones operated with respect to charging and discharging of thermal energy by flowing a heat transfer fluid—HTF—through the block or zone; an inlet charging manifold; an outlet charging manifold; an inlet pipe arranged from the inlet charging manifold to each block or zone; an outlet from each block or zone; and further structure as follows:

one or more of the valves: a flow control valve ($v_{i1}$; $v_{a1}, \ldots v_{e1}$) arranged in at least one of block or zone inlet pipes, inlets, outlets and outlet pipes, for control of flow through the block or zone; a bypass valve ($v_{i2}$; $v_{a2}, \ldots v_{e2}$) arranged in inlet charging side pipe sections between inlet pipe and serial flow return for the block or zone, for bypassing flow and serial flow control; and an outlet charging side switch valve ($v_{is}$; $v_{as}, \ldots v_{es}$) arranged in at least one of block or zone outlet pipes and outlets, for control of serial flow and parallel flow; and one or more of the pipes: an outlet pipe from a block or zone outlet or a switch valve in said outlet to the outlet charging manifold, a serial flow return pipe arranged from a block or zone outlet or from a switch valve in the outlet pipe to the inlet charging side of a next in serial flow block or zone, wherein each block/zone can operate within the full temperature range of the TES, by flowing heat transfer fluid through the blocks/zones for charging and discharging, respectively, according to temperature of the heat transfer fluid and said blocks/zones, by operating said valves to flow heat transfer fluid in serial and/or parallel, from higher temperature to lower temperature blocks/zones or side when charging and from lower to higher temperate blocks/zones or side when discharging.

The thermal energy storage is preferably a solid state thermal energy storage. The solid state thermal energy storage preferably comprises concrete, as the only or the majority of the solid state thermal energy storage material. Accordingly, the thermal energy storage is a sensible heat based thermal storage in most embodiments, which can operate freely in a temperature range from below ambient and into sub-zero temperatures, e.g. down to $-150°$ C., and up to as high temperature as the sources, heat sinks/users, HTF and valves/piping allow, that is up to at least $500°$ C. or $600°$ C., and even up to at least $980°$ C. for highest temperature resistant embodiments. Said full temperature range applies for all elements, blocks and zones. However, two exceptions from pure sensible heat exist for some embodiments of the thermal storage, method and uses of the invention; firstly, phase change material can be filled in between elements, blocks and zones inside the thermal energy storage walls; and secondly, heat transfer fluid—HTF—changing phase can be used, such as water-steam. Even with phase change material and water or other liquid that can or will evaporate as heat transfer fluid, each element, block and zone can or will be operated in a full temperature range as discussed above.

The sensible heat temperature-time plateau will not be in the elements, blocks or zones, but in the HTF and/or phase change material only. Phase change material, except water-ice, contract upon solidification, thereby avoiding inducing undue stress in the solid thermal energy storage material of the elements/blocks/zones.

The invention also provides a method of operating a thermal energy storage—TES; wherein the TES comprises: at least two blocks or zones operated with respect to charging and discharging of thermal energy by flowing a heat transfer fluid—HTF—through the block or zone; an inlet charging manifold; an outlet charging manifold; an inlet pipe arranged from the inlet charging manifold to each block or zone; an outlet from each block or zone; and valves and piping for mass flow rate control of HTF. The method is distinguished by one or more of the following steps, in any combination:

to mix and shift the flow of HTF, to and from blocks and zones, with respect to parallel and serial flow, and with respect to flow direction, according to temperature, charging and discharging of thermal energy, to charge at least one block or zone with thermal energy to a temperature above a maximum HTF outlet temperature from the TES, to discharge thermal energy from at least one block or zone to a temperature below a minimum HTF outlet discharge temperature from the TES, to mix HTF from the outlet of two or more blocks or zones, fully or partially, by operating one or more of an inlet pipe flow control valve and a switch valve of said block or zone, to bypass at least one block or zone from flow of HTF through the block or zone, fully or partially, by operating one or more of a flow control valve, a bypass valve and a switch valve of said block or zone, wherein each block/zone can operate within the full temperature range of the TES, by flowing heat transfer fluid through the blocks/zones for charging and discharging, respectively, according to temperature of the heat transfer fluid and said blocks/zones, by operating said valves to flow heat transfer fluid in serial and/or parallel, from higher temperature to lower temperature blocks/zones or side when charging and from lower to higher temperate blocks/zones or side when discharging.

One preferable embodiment of the invention is a thermal energy storage comprising at least two blocks or zones operated with respect to charging and discharging of thermal energy by flowing a heat transfer fluid—HTF—through the block or zone, wherein:

at least one block or zone comprising flow control valves ($v_{i1}$; $v_{a1}, \ldots v_{e1}$) or adjustable bypass valves ($v_{i2}$; $v_{a2}, \ldots v_{e2}$) freely operable between a fully closed position and an fully open position and position in between, is operated in a shorter term cycle, and at least one block or zone, comprising at least one of flow control valves ($v_{i1}$; $v_{a1}, \ldots v_{e1}$) and bypass valves ($v_{i2}$; $v_{a2}, \ldots v_{e2}$) with connected serial return line, is operated in a longer term cycle. If a constant HTF temperature out from the storage is required at all time, even when operating a longer term cycle block or zone with valves which can be but for most embodiments is not of merely open-closed type, the flow of heat transfer fluid can be routed through control valves of the shorter term cycle block or zone.

Another embodiment of the invention is a solid state thermal energy storage in which heat is transferred to and from solid state heat storage elements during charging and discharging by way of a heat transfer fluid—HTF—that runs through heat exchanger pipes cast into the elements or around such elements, the storage is divided into two or more block units for which the HTF can run from an inlet manifold system on one flow side of the blocks and through the different block units to an outlet manifold system on the other flow side, while the fluid transfers heat to all elements within the block during thermal energy charging, and absorbs heat from all elements within the block during thermal energy discharging, and for at least two blocks the following is provided:

a. an adjustable flow valve that controls the HTF mass flow rate from the manifold into the block during charging and discharging b. an adjustable bypass valve that controls the HTF mass flow rate bypassing the block during charging and discharging
c. an adjustable switch valve that controls the ratio of HTF mass flow rate through the block directly connected with the outlet manifold to the HTF mass flow rate being diverted to the next in serial flow block inlet side by which said at least two blocks can be controlled dynamically such that a desired number of blocks will be engaged in a parallel or in a serial flow pattern, or a combination of these, and through adjustment of the valves the charging and discharging of blocks can be shifted and mixed in time such that the combined, outflowing heat transfer fluid can be kept at a stable level and within maximum and minimum temperature bounds determined by the heat source and the heat sink, while major parts of the storage can be charged and discharged far beyond said thermal limits and thereby increase the overall energy storage capacity significantly.

Shifting and mixing the flow of HTF over time according to temperature in agreement with the present invention, can alone increase the TES storage capacity by up to over 60% as compared with a similar storage with only one inlet/outlet at warm and cold side, respectively, and without blocks/zones and valve configuration as prescribed. Based on calculations/simulations, in one case the improvement is 45-55%, in another case the improvement is 55-65%. Improvement in the full range from above 0% up to at least 65% is achieved by merely shifting and mixing as prescribed, as compared with a similar storage with only one inlet/outlet at warm and cold side, respectively, and without blocks/zones and valve configuration as prescribed. Charging and/or discharging blocks of the TES beyond respective maximum and minimum HTF outlet temperature limits, increase the technical effect further. Valves and blocks/zones as described and defined according to the invention are essential structure to achieve such capability of a TES. Without wishing to be bound by theory, the significant technical effect has to do with arranging and operating the TES such that a larger temperature difference between flowing HTF and thermal energy storage material is achieved. All of this will be clearer by studying the description, claims and figures in detail.

Additional embodiments of the invention are provided by combining obligatory or preferable embodiments with features herein described or illustrated, in any combination. Further embodiments of the invention are provided by combining features herein described or illustrated, in any combination resulting in functional embodiments.

FIGURES

The invention is illustrated by 23 figures, illustrating details, features and embodiments of the present invention, as follows:

FIG. 1 shows a longitudinal and cross-section view of a thermal element 10 as described in patent NO 339848. The element consists of two U-tube heat exchanger pipes 11 for transfer of heat transfer fluid 12. These are cast into a solid-state material 13, which is typically a special type of concrete with superior heat conductivity, heat capacity and strength properties at the appropriate temperature regime. The element is surrounded by a steel casing 14 that serves both as steel reinforcement and casting form.

FIG. 2 shows how thermal elements can be bundled and connected within a steel cassette frame 20 as described in patent NO 340371. The cassettes frames 20 serve the purpose of efficiency and practicality in transport, handling, casting the elements with solid material 10, and keeping the elements together for connecting heat exchanger pipes 11. A fully casted cassette is termed a module 21 and has one common manifold pipe 22 for inflow and a common manifold for outflow 23 (or vice versa). The modules 21 can be placed side by side and stacked on top of each other to form a stack 24. A system of several modules that have one common inflow pipe and one common outflow pipe and have its own set of valves that fully controls the HTF flow is denoted a block. For instance, the assembly of 5 by 5 modules as illustrated in the figure could form one block while, as shown in examples, it can be divided into several blocks in parallel or serial configuration.

FIG. 3 shows one of several alternatives with HTF flowing on the outside of the thermal elements as described in patent NO 339952. There is a fully enclosing chamber structure with thermally insulated walls 30. The chamber is filled with thermal elements 31 with a spacing between the elements such that the HTF can flow from the hot side 33 to the cold side of the chamber 34. Alternatives to previously mentioned thermal elements may be stone pebbles, bricks, ceramic elements, or forms of granular materials that can withstand the heat from the hot HTF flowing around. The HTF is fed from an inlet on one side 35 to an outlet 36 on the opposite side when the storage is being charged, and vice versa when the storage is being discharged. The principle for charging and discharging is, in principle, similar to systems with internally cast heat exchangers. A storage consisting of several chambers with separate systems for control of inflow for charging and discharging can be operated according to the current invention. The thermal elements can be as illustrated in FIG. 1, or different, for example without cast-in heat exchangers 12 and/or without a steel casing 14.

FIG. 4 illustrates the concept of a "serial element" which is an expression of a series of thermal elements that are connected by a continuous, single heat exchanger pipe that goes from the manifold pipe on one side of a block to the manifold of the other side of a block. A block thus represents a given number of serial elements in parallel that share the same location for inflow and outflow of HTF.

FIG. 5 illustrates the shaded envelope of temperature variation along the length of a serial element for a complete cycle of charging and discharging of heat. This envelope may be compared to "the theoretical potential for thermal energy storage" as represented by the area of the rectangle formed by the difference between inflow charging temperature $T_{ci}$ and inflow discharge temperature $T_{di}$ times the heat storage capacity per length unit for the full length of the serial element.

FIG. 6 illustrates the layout of a parallel system with pipes and valves for an example of a total of five blocks. FIG. 6 illustrates an inlet charging manifold 37, an outlet charging manifold 39, and an inlet pipe 39 from the inlet charging manifold to each block or zone.

Figure 9:
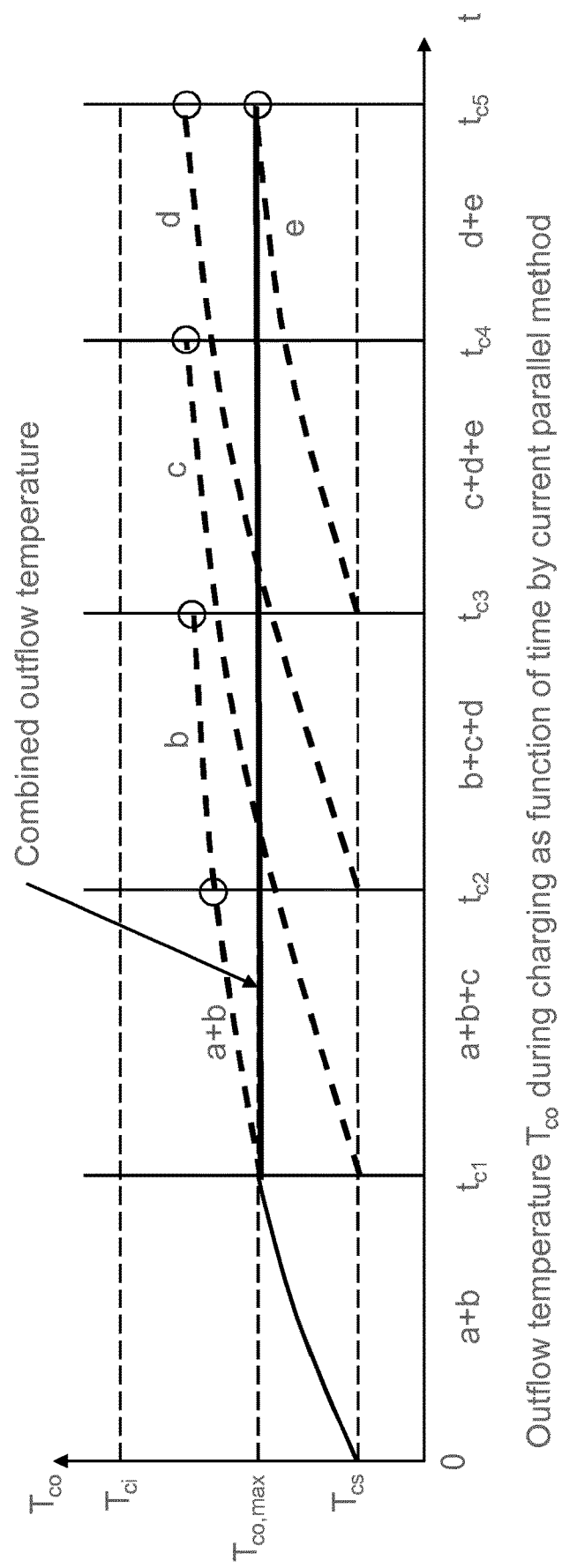

FIG. 9 shows a diagram of combined outflow temperature (continuous drawn line) as function of time during charging for a parallel system of blocks that is operated with gradual shift of flow through the various blocks; the case illustrated shows a maximum of three blocks being engaged at the same time. The valves are balanced in such a way that the outflow temperature after a while is kept constant at $T_{co,max}$. An important result for this particular configuration is that the actual outflow temperature from the individual blocks a, b, c and d can go beyond the defined maximum combined charge outlet temperature of the entire system; this implies achieving an enhanced thermal energy storage level, by way of extending the envelope illustrated in FIG. 5 with respect to $T_{co,max}$. Note also that the initial start temperature $T_{cs}$ depends on how the system has been previously operated during discharging. In most cases $T_{cs}$ will be close to the discharge inflow temperature $T_{di}$.

Figure 10:
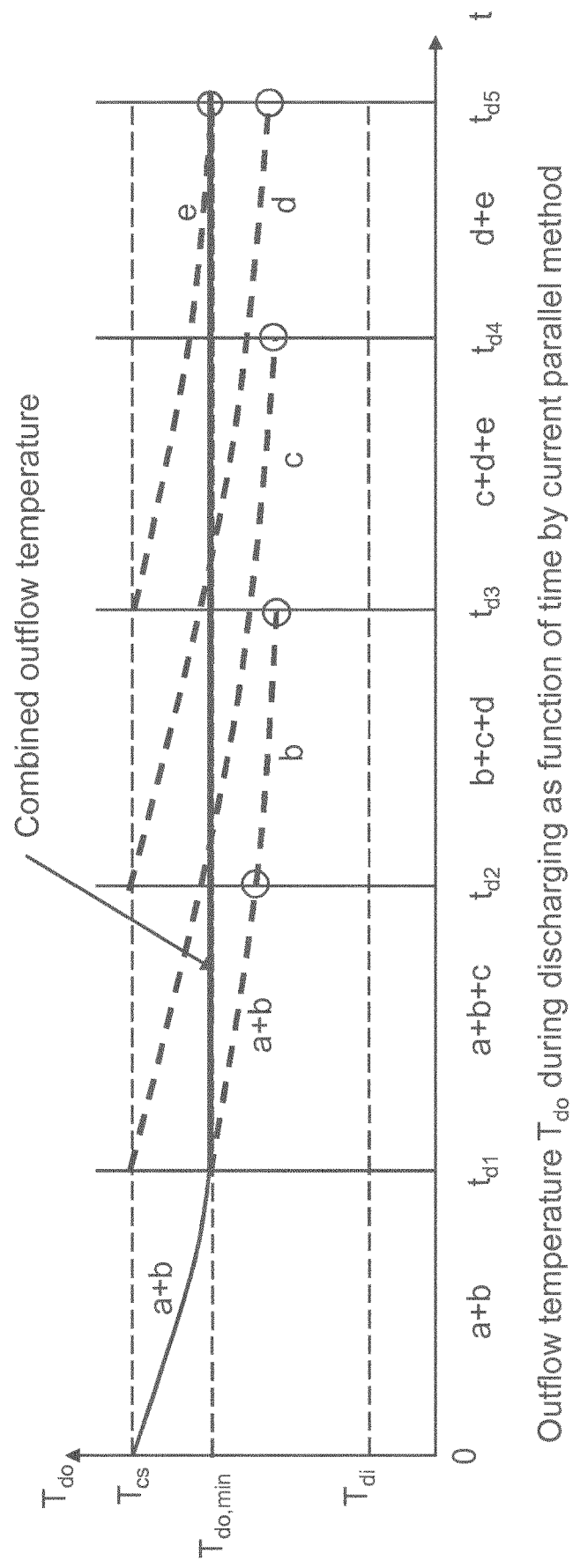

FIG. 10 shows a diagram system of combined outflow temperature (continuously drawn line) as function of time during discharging for a parallel system of blocks that is operated with gradual shift of HTF flow through the various blocks; the particular case shows a maximum of three blocks being engaged at the same time. The valves are balanced in such a way that the combined outflow temperature after a period of time is kept constant at $T_{do,min}$. An important result is that the actual outflow temperature from individual blocks can go below the defined minimum temperature; this implies achieving a deeper level of thermal discharging, by way of extending the envelope illustrated in FIG. 5 with respect to $T_{do,min}$. Note also that the start temperature $T_{ds}$ depends on how the system has been previously operated during charging. In most cases $T_{ds}$ will be close to the charge inflow temperature $T_{ci}$.

Figure 5:
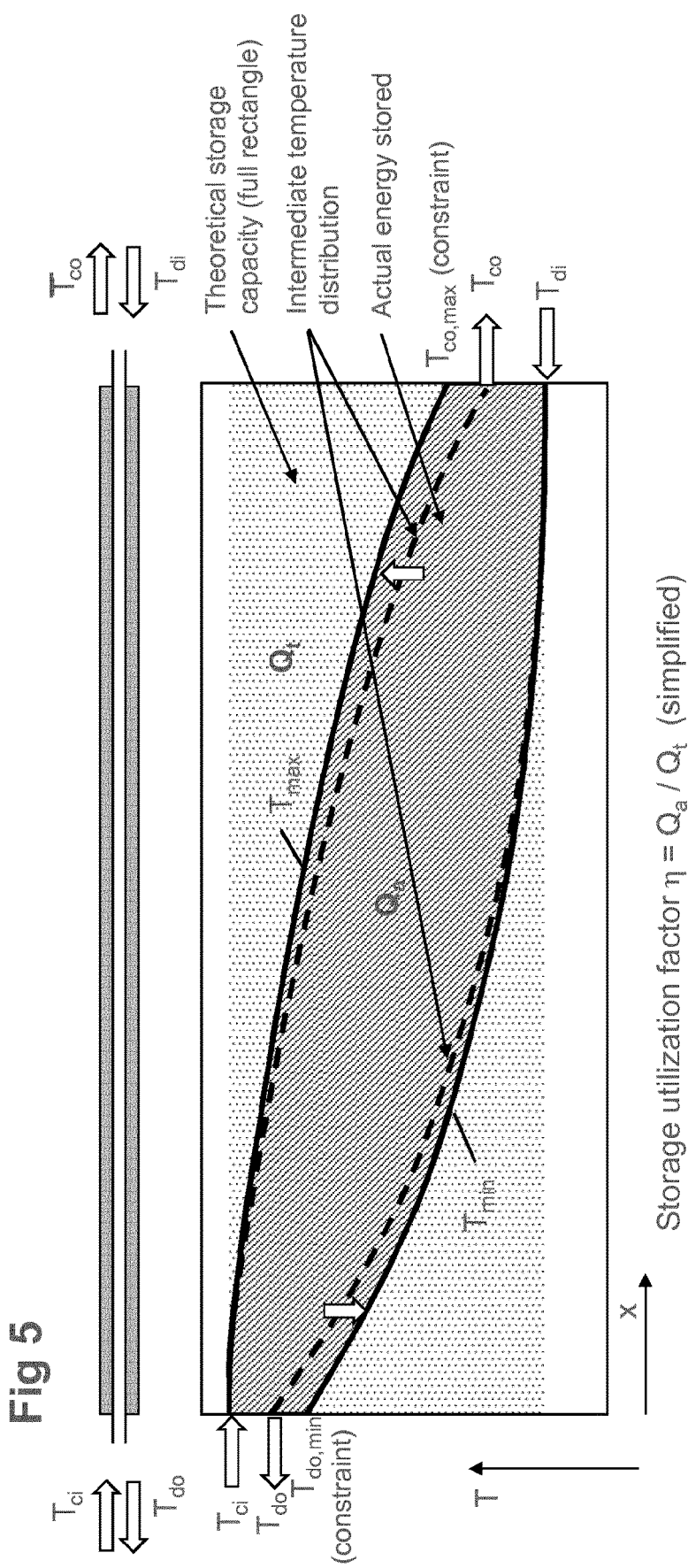
Figure 11:
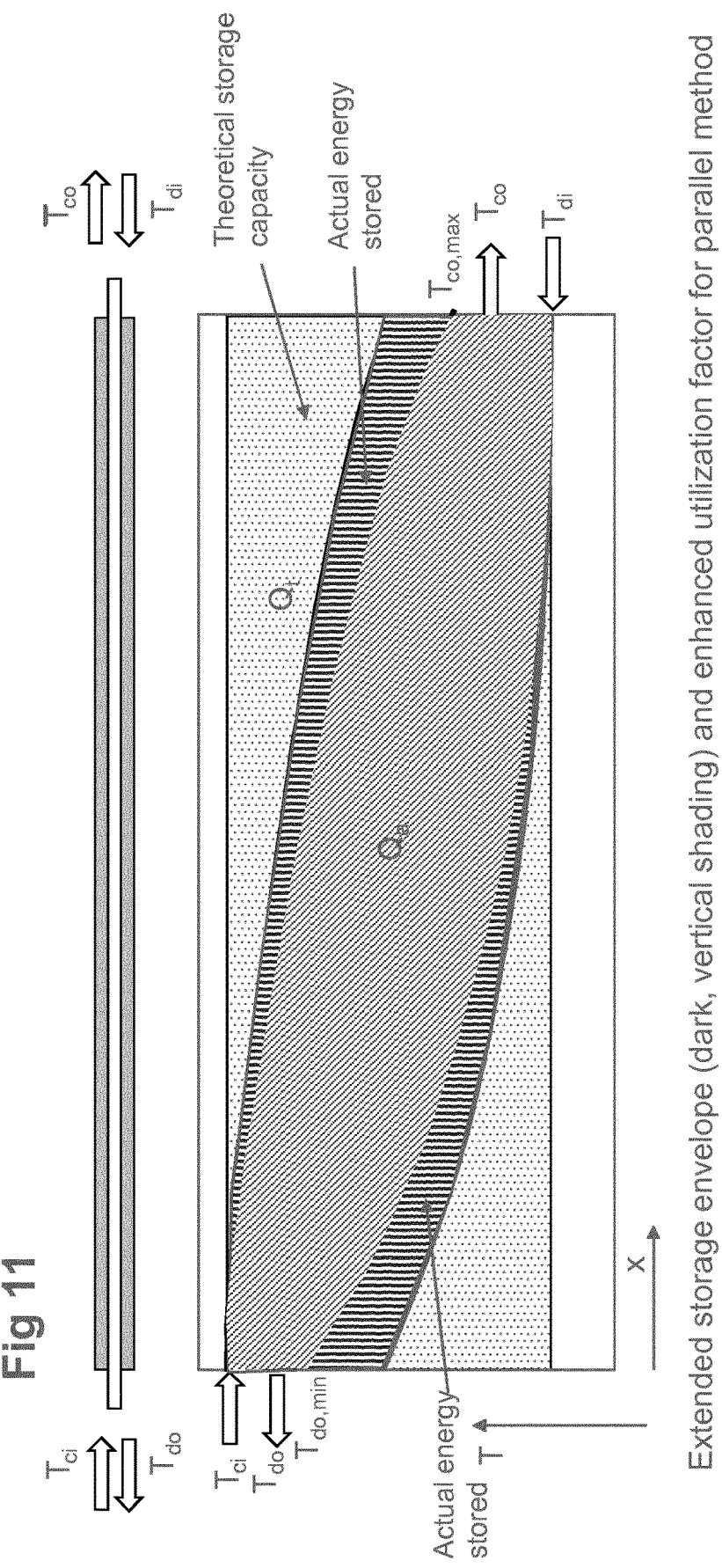

FIG. 11 shows a diagram corresponding to FIG. 5 where the thermal envelope has been extended with the vertically shaded areas by use of a described operation strategy with parallel flow with mixing of individual outflow temperatures and shifting of blocks engaged; this implies better utilization of the energy storage potential of the thermal energy storage.

Figure 12:
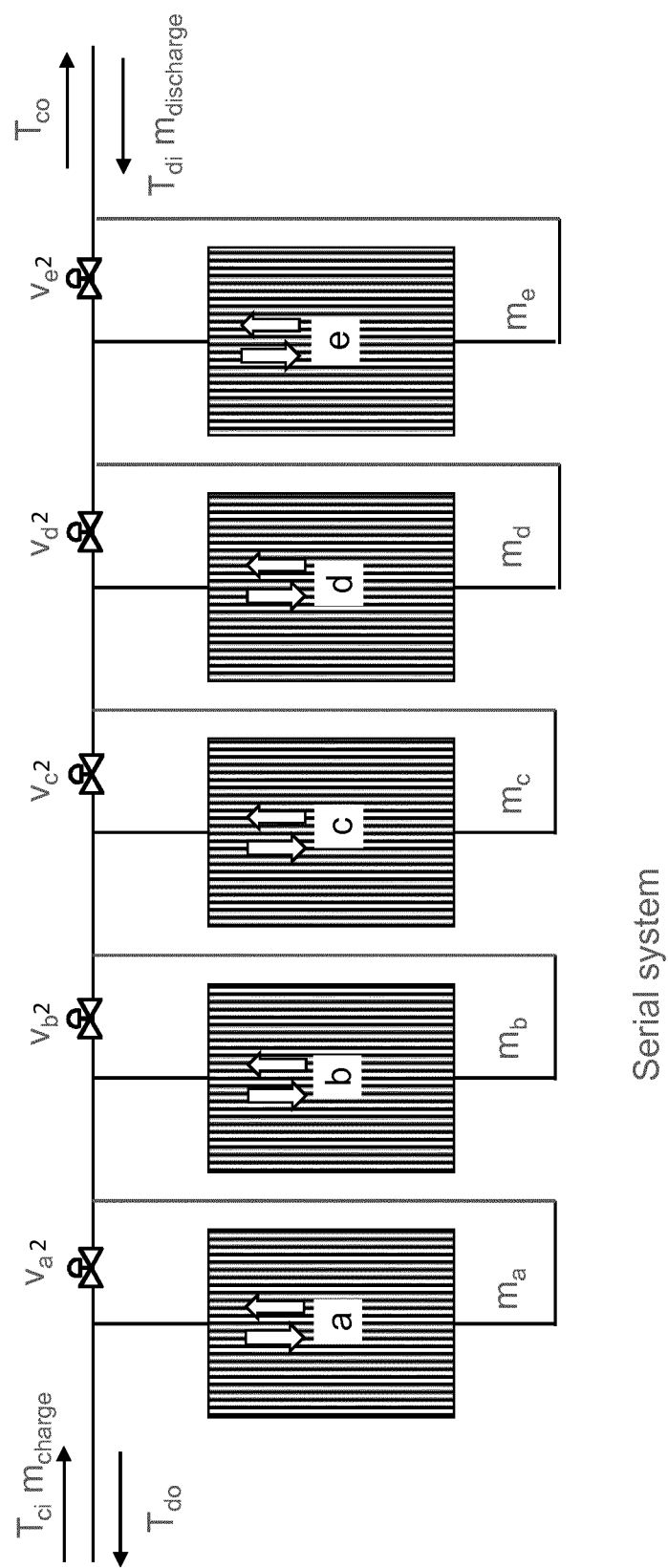

FIG. 12 illustrates the layout of a serial system with pipes and valves for an example of a total of five blocks.

Figure 13:
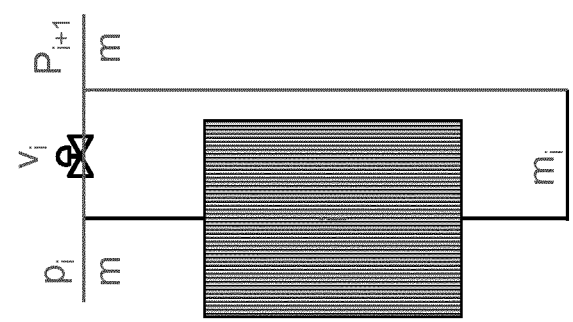

FIG. 13 shows in more detail how the HTF flow through a serial block may be split into one part that bypasses the block and one part that goes through the block.

Figure 14:
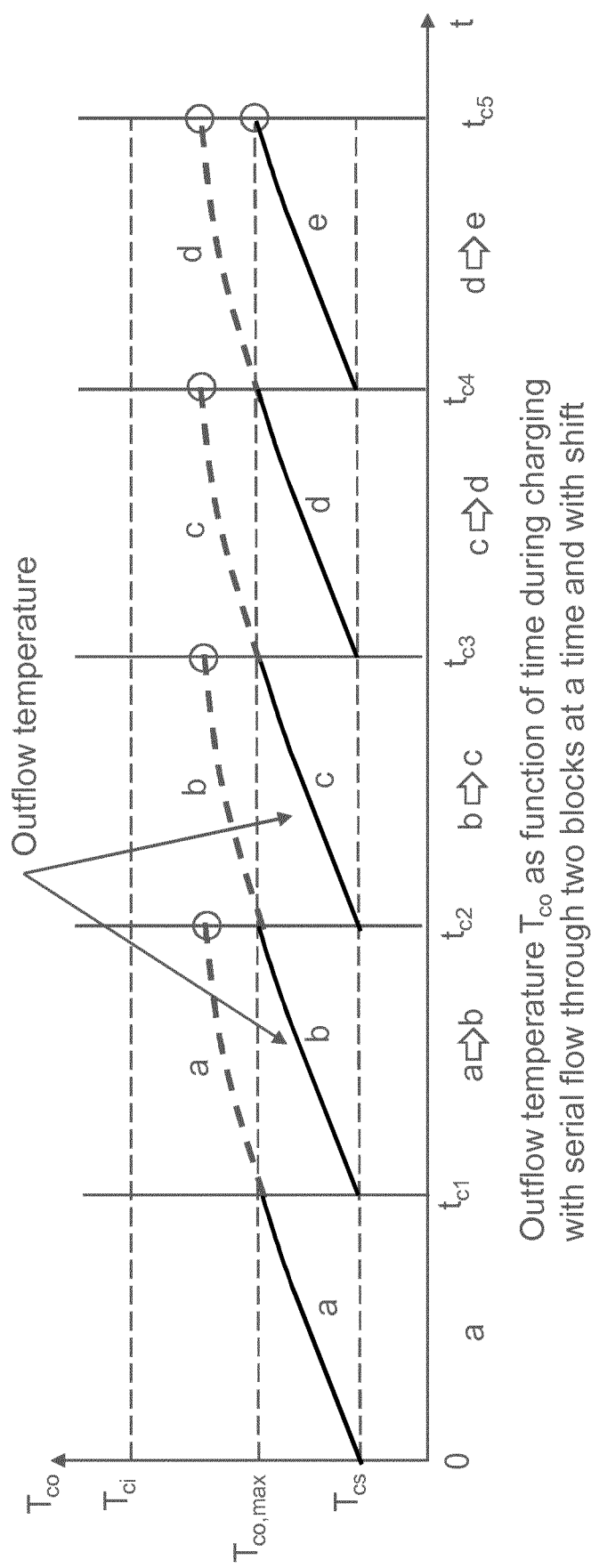

FIG. 14 shows a diagram of system outflow temperature (fully drawn line) as function of time during charging for a serial system of blocks that are operated with shift of flow through the various blocks; the diagram illustrates a case with maximum of two blocks being engaged at the same time. The charging process starts with passage through the first block only until the outflow temperature has reached $T_{co,max}$. At that moment, the next bypass valve is closed and the flow is directed through the first two blocks. When the outflow temperature again reaches the allowed maximum level the first block is bypassed and the flow is sequentially directed through the next block by closing the associated bypass valve. This process of closing and opening bypass valves is thus continued through the whole series of blocks. It is to be noted that main parts of the storage can be charged beyond the prescribed maximum outflow temperature; a drawback is that the system outflow temperature varies with time. Note also that the initial start temperature $T_{cs}$ depends on how the system has been previously operated during discharging. In most cases $T_{cs}$ will be close to the discharge inflow temperature $T_{di}$.

Figure 15:
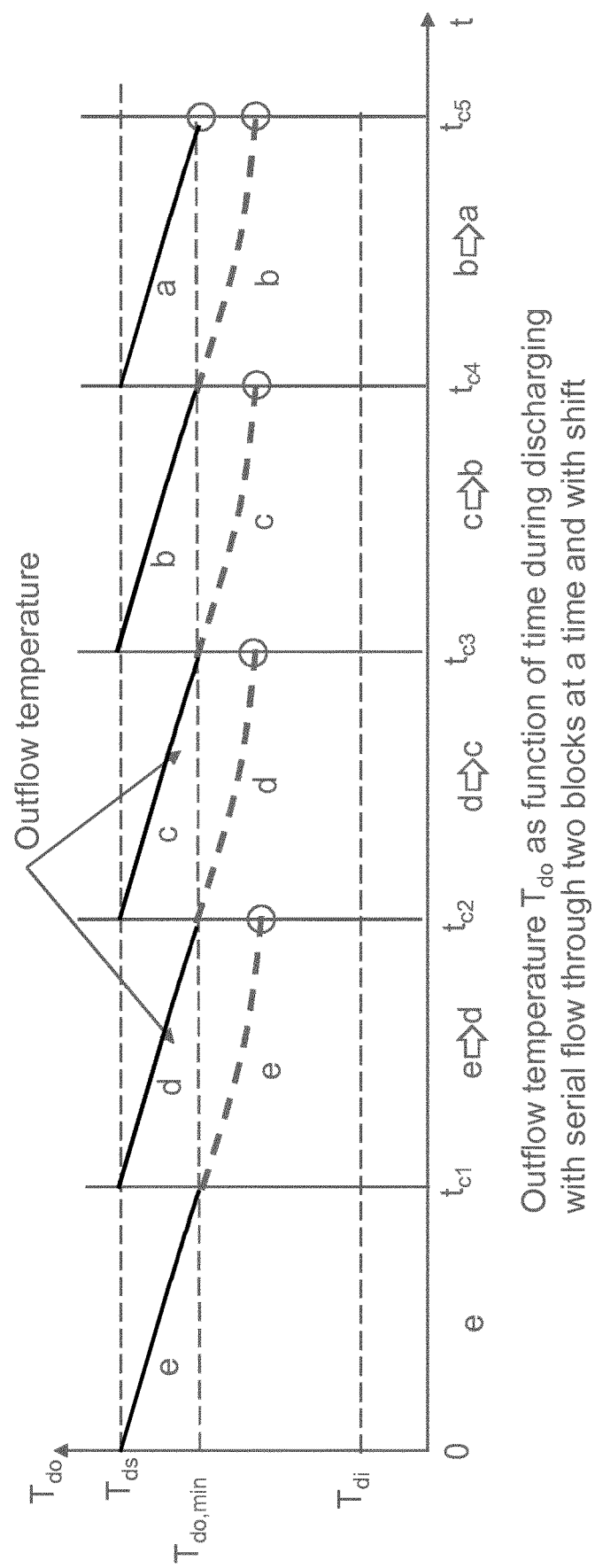

FIG. 15 shows a diagram of system outflow HTF temperature (full drawn line) as function of time during discharging for a serial system of blocks that are operated with shift of HTF flow through the various blocks; the diagram illustrates a case with maximum of two blocks being engaged at the same time. The process starts with reversed flow and passage through the end block only until the outflow temperature has reached $T_{do,min}$. At that moment, the next bypass valve is closed and the flow goes also through the next block. When the outflow temperature again reaches the minimum the end block is bypassed and the flow is sequentially directed through the next block by closing the associated bypass valve. This process of closing and opening bypass valves is thus continued through the whole series of blocks. It is to be noted that main parts of the storage can be charged beyond the prescribed minimum outflow temperature; a drawback is that the system outflow temperature varies with time. Note also that the start temperature $T_{ds}$ depends on how the system has been previously operated during charging. In most cases $T_{ds}$ will be close to the charge inflow temperature $T_{ci}$.

Figure 16:
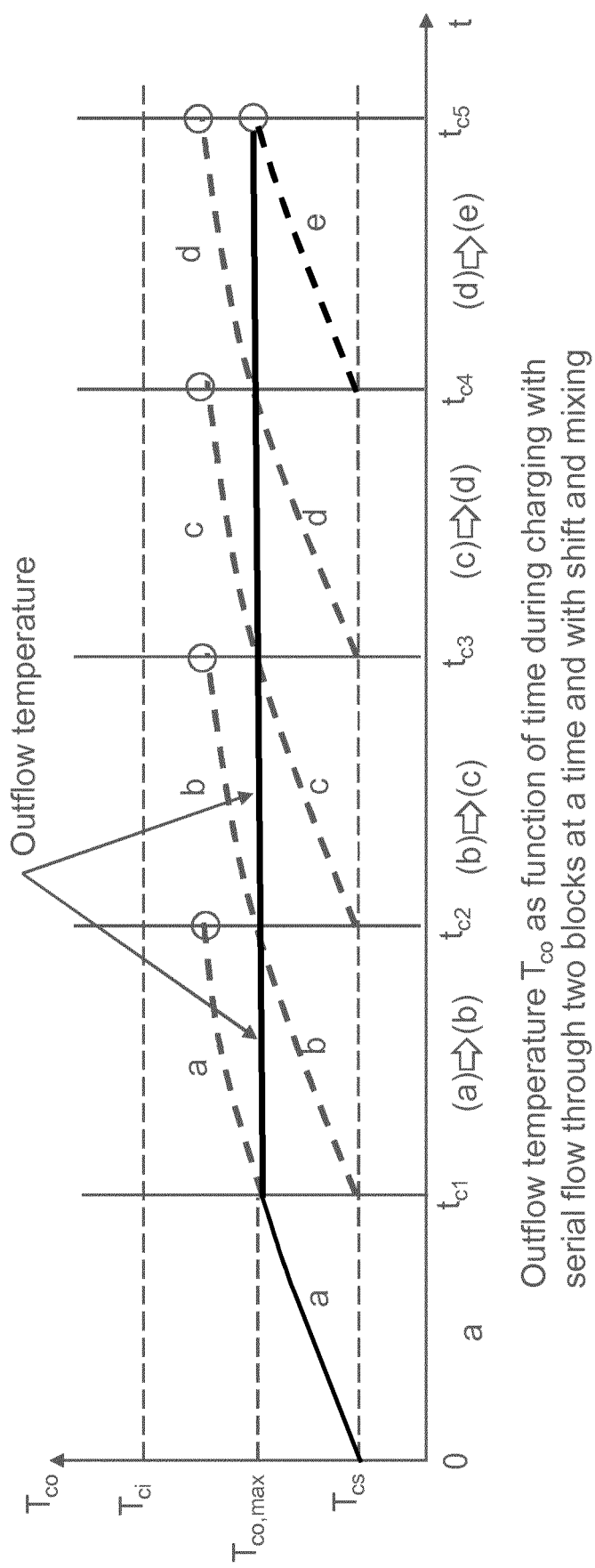

FIG. 16 shows a diagram of system outflow temperature (continuously drawn line) as function of time during charging for a serial system of blocks that is operated with gradual shift of flow through the various blocks; the case shows a maximum of two blocks being engaged at the same time. The bypass valves are balanced in such a way that the outflow temperature after a while is kept constant at $T_{co,max}$. Note that the actual outflow temperature from individual blocks can go beyond the same maximum temperature; this implies achieving an enhanced charging level.

Figure 17:
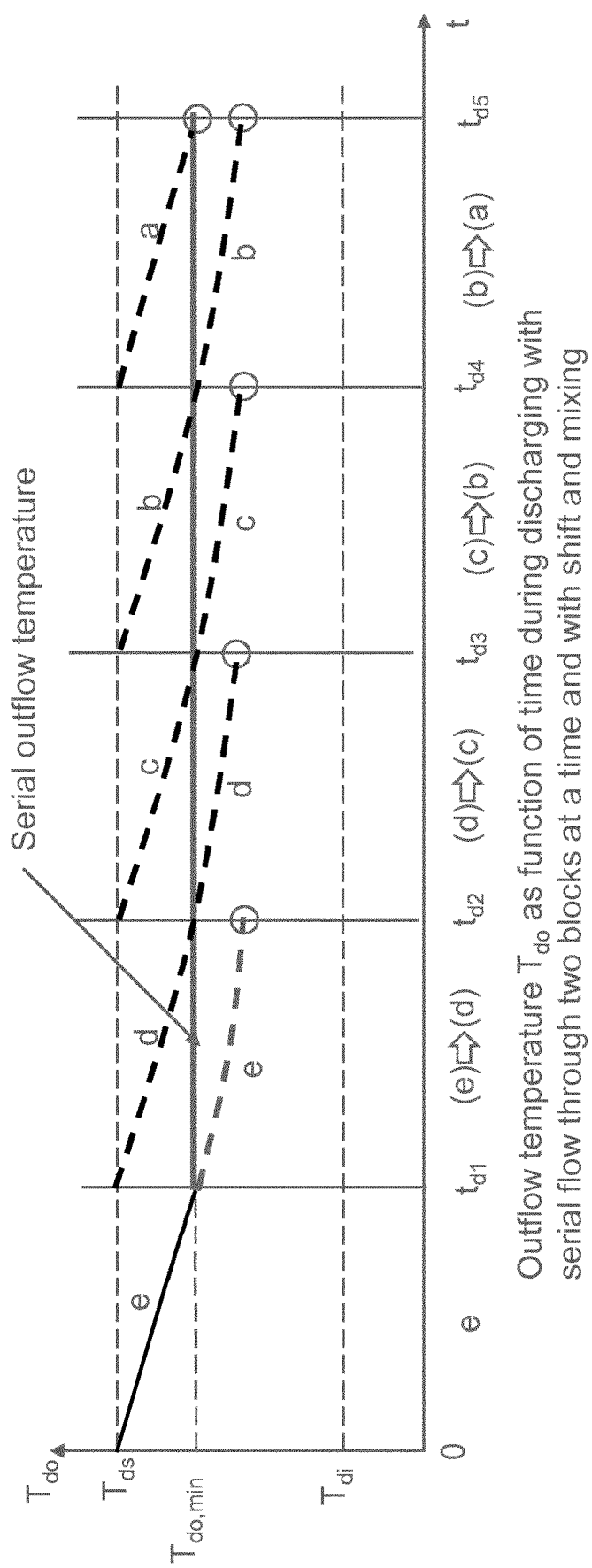

FIG. 17 shows a diagram of system outflow temperature (continuously drawn line) as function of time during discharging for a serial system of blocks that is operated with gradual shift of flow through the various blocks; the case shows a maximum of two blocks being engaged at the same time. The valves are balanced in such a way that the outflow temperature after a while is kept constant at $T_{do,min}$. Note that the actual outflow temperature from individual blocks can go below the same minimum temperature; this implies achieving a deeper level of discharging.

Figure 18:
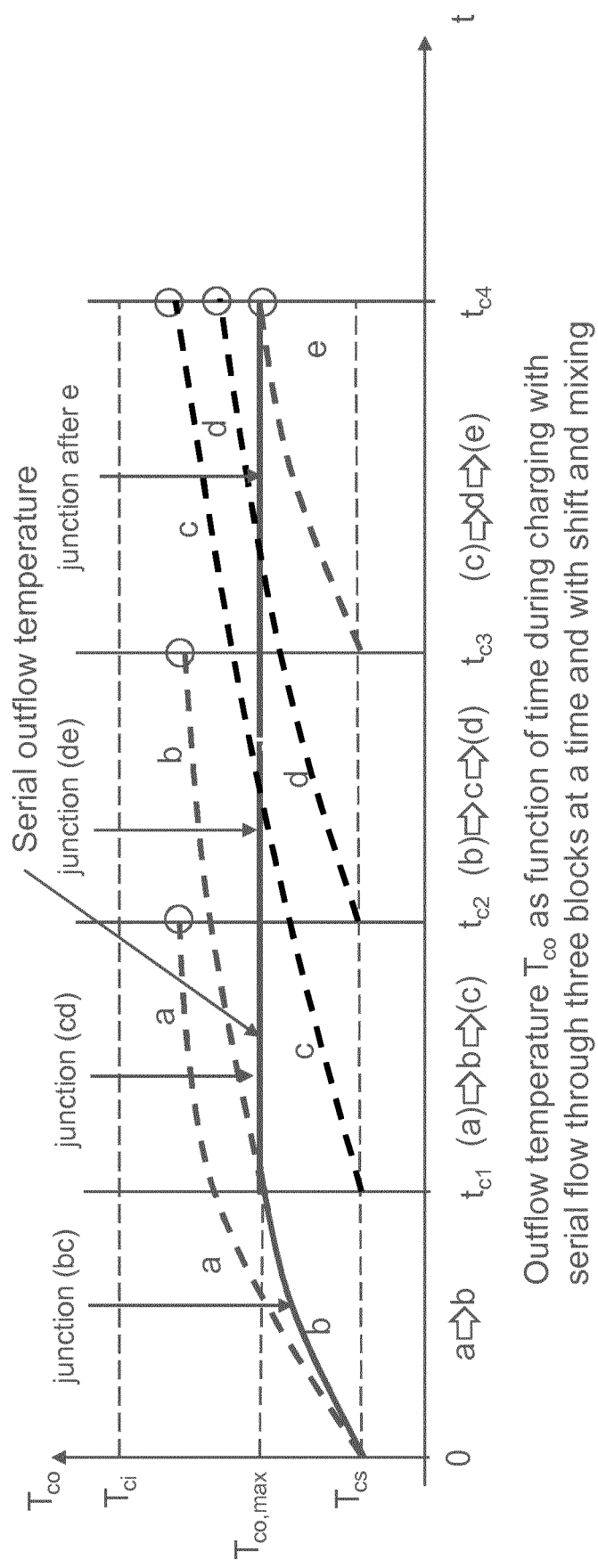

FIG. 18 corresponds to the case of charging shown in FIG. 16 with the difference being that as much as three blocks are being engaged at one time rather than two as described in the previous case. The purpose of this case is to illustrate the flexibility of the current invention. The figure is self-explanatory in view of the description of FIG. 16.

Figure 19:
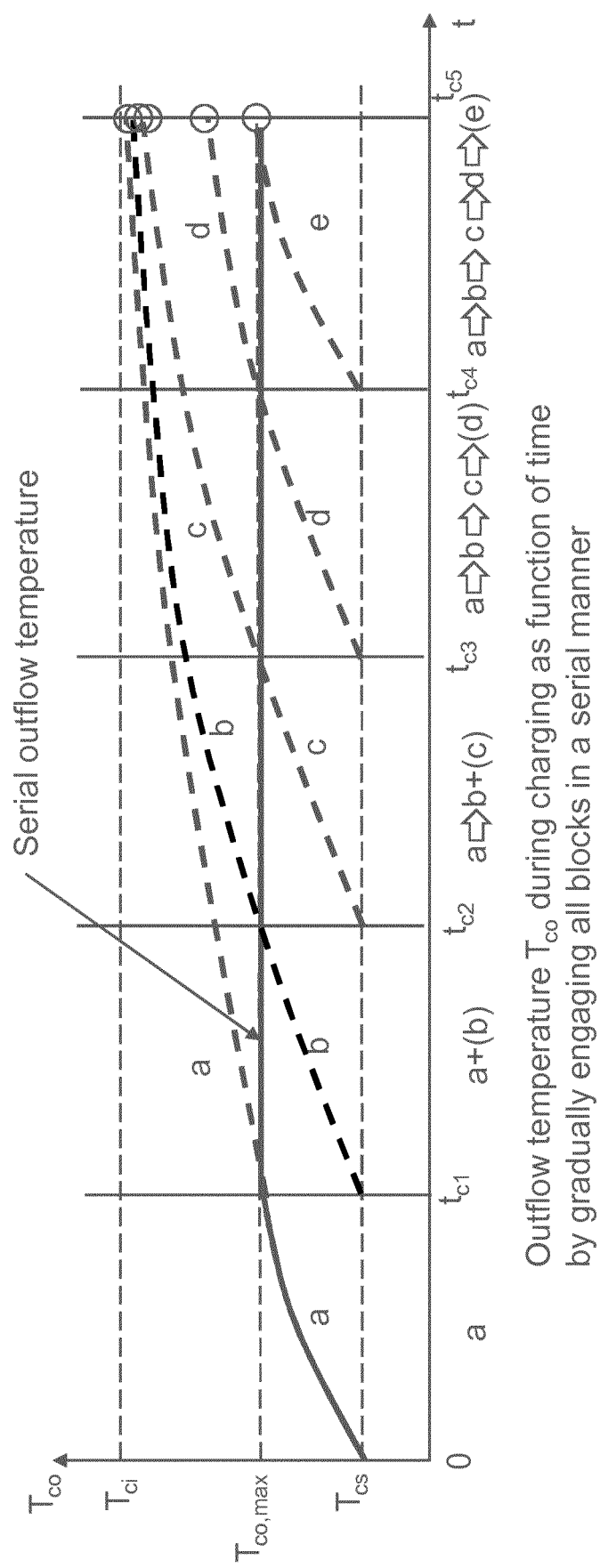

FIG. 19 shows another option of operating a serially configured system during charging according to the invention. Initially the flow first goes only through the first block until the outflow temperature reaches $T_{co,max}$ while all other blocks are bypassed (bypass valves open). At that moment, the bypass valve for the second block is gradually closed while the bypass valve for the first block is kept closed. The regulation of the second bypass valve is done in such a way that the mix of flow through the second block and the flow that bypasses this block maintains the desired temperature of $T_{co,max}$. When the bypass valve for the second block is fully closed the bypass valve for the third block is gradually closed such that the flow through the first two blocks is gradually mixed with flow through the third block to ensure that the mixed outflow keeps the desired temperature. The same process is continued for the following blocks. The procedure gives a very high charging of energy for most of the storage beyond the maximum temperature limit, while the downside is that the pump pressure must be increased for every new block that is engaged to keep the desired mass flow through an increasing number of blocks.

Figure 20:
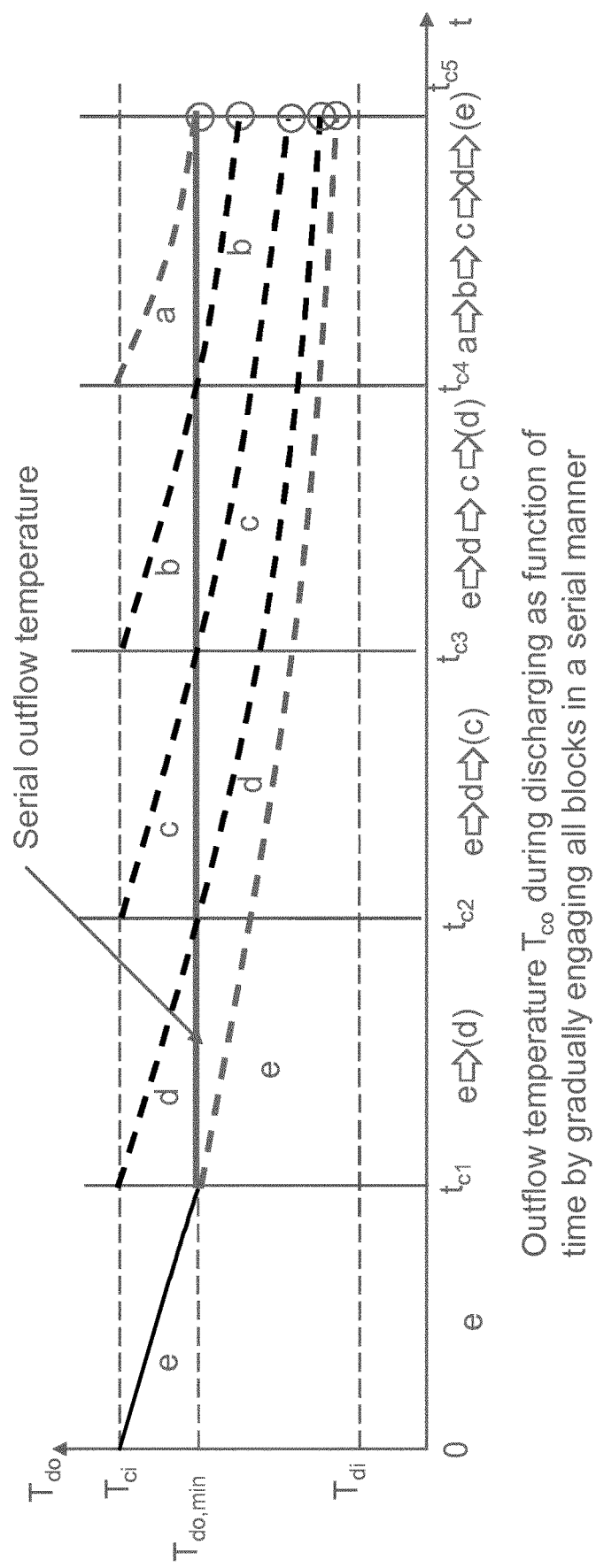

FIG. 20 shows the discharging procedure, corresponding to FIG. 19, where the flow is reversed, and the inflow starts from the opposite end. Initially the flow goes only through the first block until the outflow temperature reaches $T_{do,min}$ while all other blocks are bypassed (bypass valves open). At that moment, the bypass valve for the second block is gradually closed while the bypass valve for the first block is kept closed. The regulation of the second bypass valve is done in such a way that the mix of flow through the second block and the flow that bypasses this block maintains the desired temperature of $T_{do,min}$. When the bypass valve for the second block is fully closed the bypass valve for the third block is gradually closed such the flow through the first two blocks is gradually mixed with flow through the third block to ensure that the mixed outflow keeps the desired temperature. The same process is continued for the following blocks. The procedure gives a very deep charging of energy for most of the storage below the minimum temperature limit while the downside is that the pump pressure must be increased for every new block that is engaged to keep the desired mass flow through an increasing number of blocks.

Figure 21:
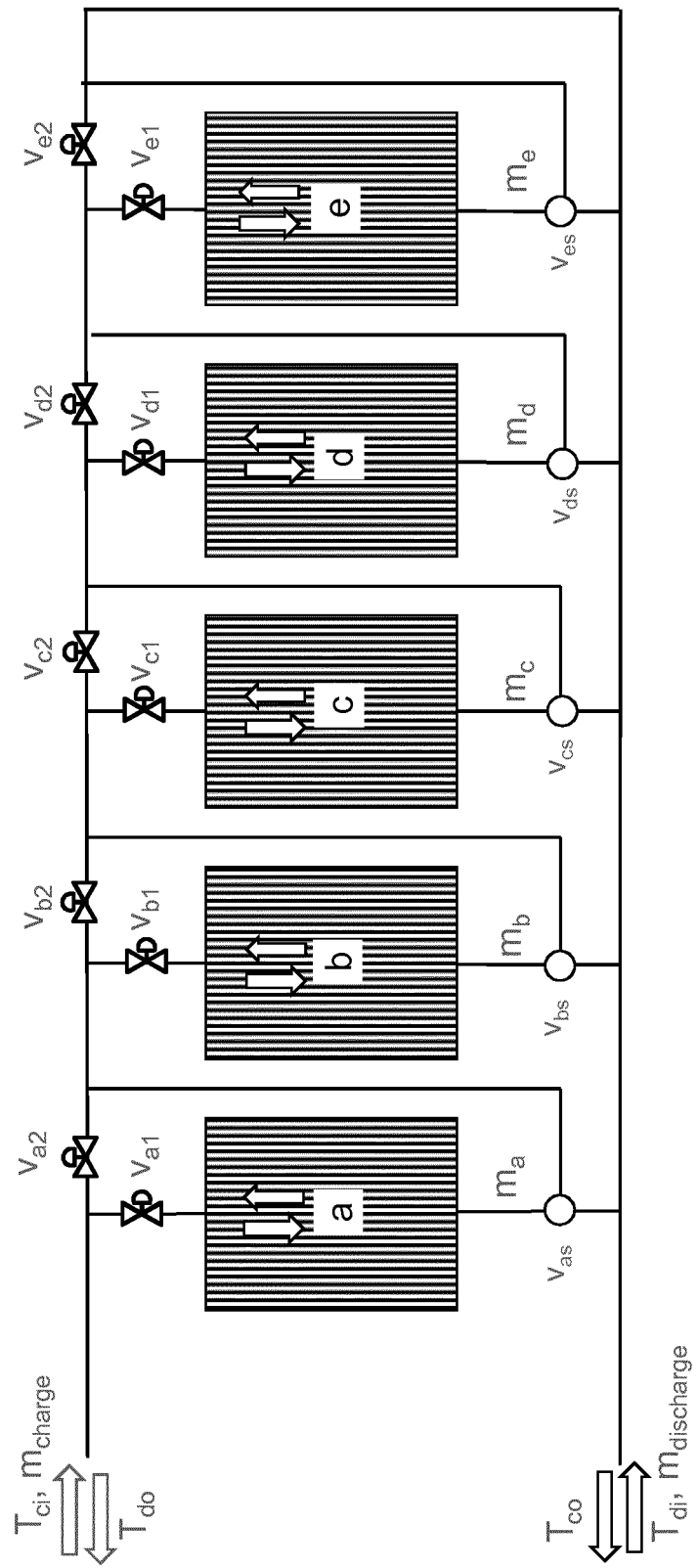

FIG. 21 illustrates a complete system design of the invention enabling for the storage to be operated in either parallel modes or serial modes, or combination thereof. Connected with each block "i" there is an inflow valve $v_{i1}$, and a bypass valve $v_{i2}$. The lower side of the diagram shows for each block pipe coupling with the lower main pipe as well as a back-loop pipe to the upper main pipe. A three-way valve $v_{is}$ determines whether the flow associated with the block is connected directly to the lower pipe (parallel mode) or the back-loop pipe (serial mode).

Figure 22:
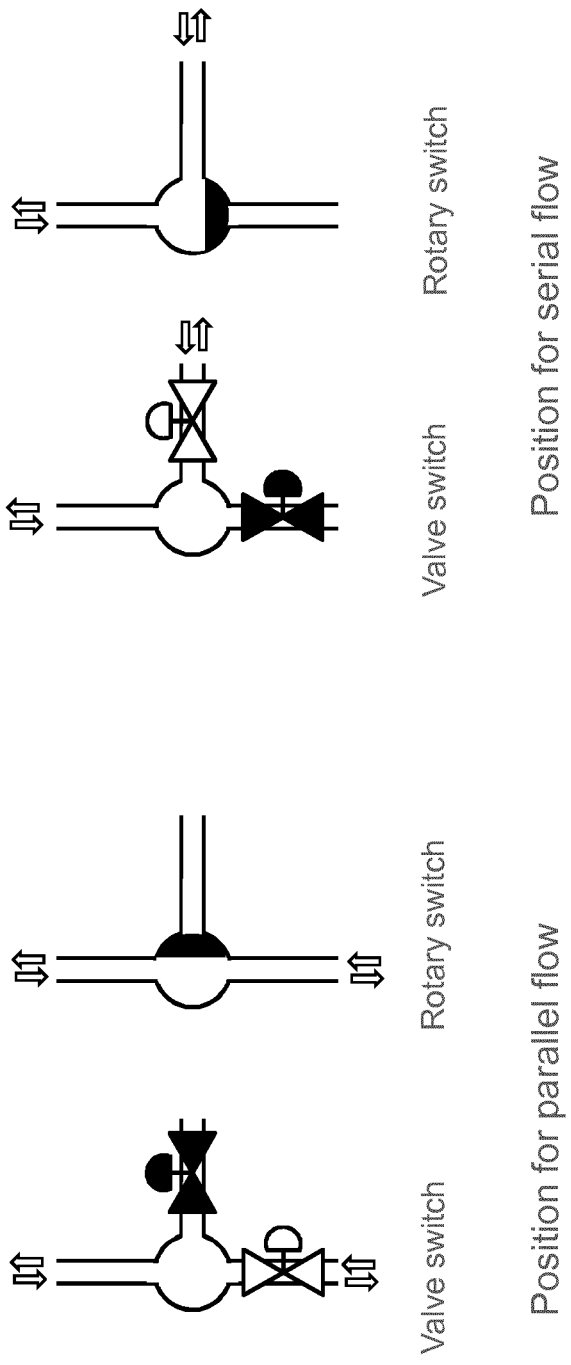

FIG. 22 is a schematic illustration of a three-way valve system controlled by two, simple valves that are operated in opposite opening and closing positions. The positions of these valves determine whether the flow corresponds to parallel or serial modes or mixed parallel and serial flow.

Figure 23:
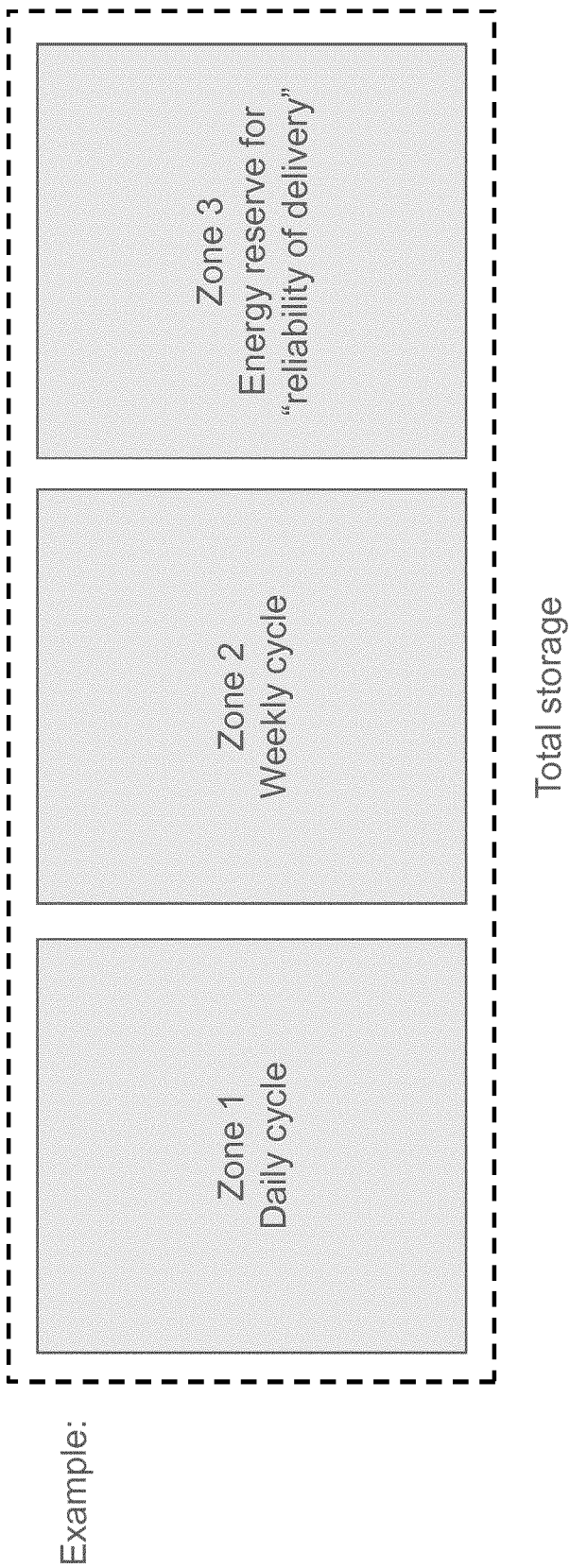

FIG. 23 is a schematic illustration of a storage which may be divided into different zones that are operated with time cycles such as daily cycles, weekly cycles and energy reserve. The different zones may be charged and discharged in parallel mode or serial mode or combinations thereof.

GENERAL DESCRIPTION FOR UNDERSTANDING THE PRINCIPLES OF THE INVENTION AND THE FIGURES

In the following, any representation of modular, thermal energy storage is considered, including those that have been specifically mentioned, including vertical and/or horizontal orientation of the storage elements. It is assumed that different parts of the storage are connected by way of pipes and valves such that HTF inflow from a main trunk pipe is split into branch pipes and thereby gain access to all or most elements in the storage. To describe and explain the invention clearly, several concepts and definitions will be introduced.

A series of thermal elements that are connected by continuous heat exchanger pipes in a fixed, serial manner will be defined as a "serial element"; thus, a serial element may consist of several single elements. Typically, the serial element forms the basis for analysis of heat transfer during charging and discharging and may computationally be treated as "one element". An example of a serial element may be seen in FIG. 2 where the design comprises a series of parallel heat exchanger pipes that enable parallel flows of HTF from the top to the bottom of a stack of 5 modules. A serial element is thus the sum of individual elements that are connected by a continuous pipe system from one end or side of controlled HTF inflow to another end or side of outflow. Thus, when analyzing the response of a storage during charging, discharging and resting periods, the combination of thermal elements that are serially coupled may be considered as being "one element" in a computational sense. During numerical modelling, the serial element is typically broken up in smaller "finite elements"; however, these do not have to coincide in length with the physical, thermal elements.

Figure 1:
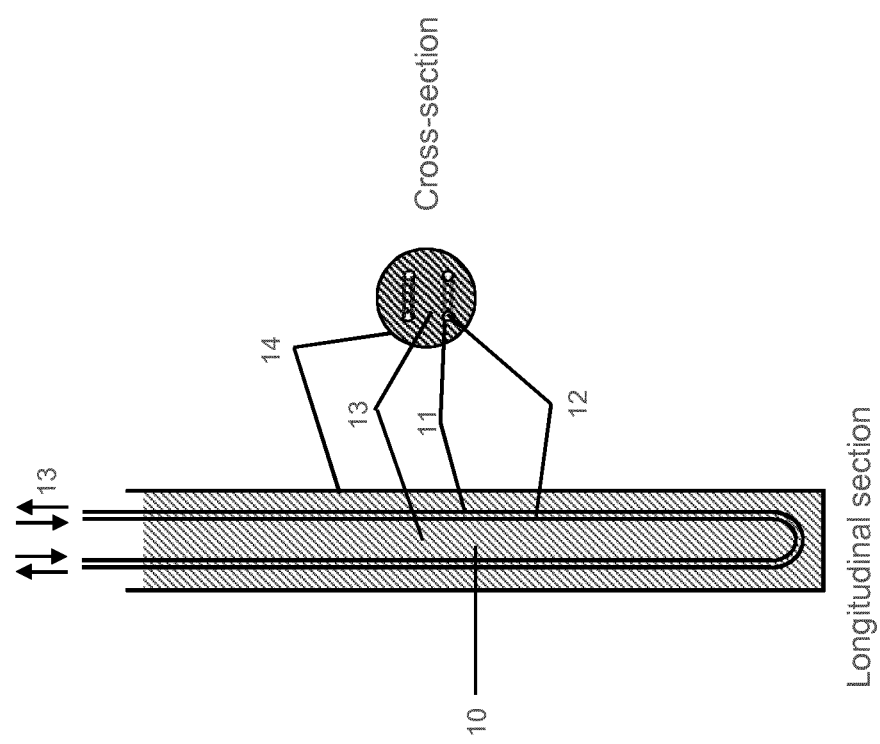
Figure 2:
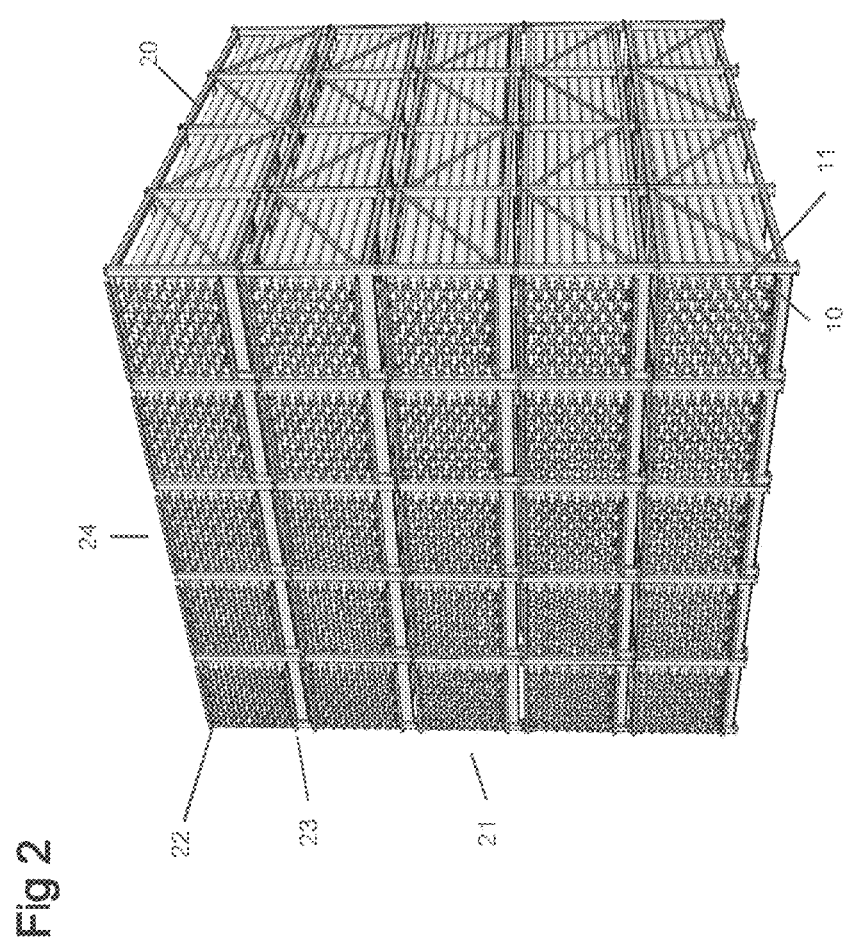

The serial elements can be arranged in a parallel manner in a storage as shown for modular units that are stacked on top of each other in FIG. 2. Further, a storage may contain many such stacks. It is to be noted that the thermal elements, in the case of using the design of FIG. 1, are of "double U" type which means that there are two parallel pipes that goes in and out of each element, each having total length 2 times element length L and associated solid state material (such as concrete) per unit length equal to one fourth of the total cross-sectional area of the thermal element.

A group of serial elements arranged in parallel, for instance several stacks of modules or elements, that are fed from the same manifold pipe, and controlled by the same valves, is defined as "a block". Thus, a block consists of multiple parallel heat exchangers surrounded by solid state thermal storage material (such as concrete) that are served from a common manifold in either flow ends, whereby the inflow and outflow can be controlled by block valves. As example, let us assume that the five stacks of five modules each in FIG. 2 are connected by common manifolds at the top and bottom and that the flow in and out of these manifolds are controlled by associated valves. There are 63 elements (9 horizontally×7 vertically) in each module. As seen from FIG. 2 this corresponds for this case to 9×2×5=90 "serial elements", each with storage length $L_s$=L×2×7× 5=70L, where L is the length of an individual storage element. One, two, three, or many, such as 48 or 63 or more elements or modules, arranged in parallel and/or series with respect to flow, but operated uniformly as one unit by operating valves, is a block.

In the simplest case, and as prior state of the art technology has been described, all parts of the storage will in fact have the same HTF flow where main top and bottom trunk pipes by way of manifolds split the heat transfer fluid equally into all parts of the storage; i.e. all serial elements will get the same mass flow and have the same temperature distribution along the full length. The current invention provides an innovative design with a special way of organizing pipes and valves such that the overall performance of the storage becomes significantly enhanced through increased, overall storage capacity and control of combined outflow temperature levels suitable for the overall system of heat source and heat sink (use of heat).

Figure 4:
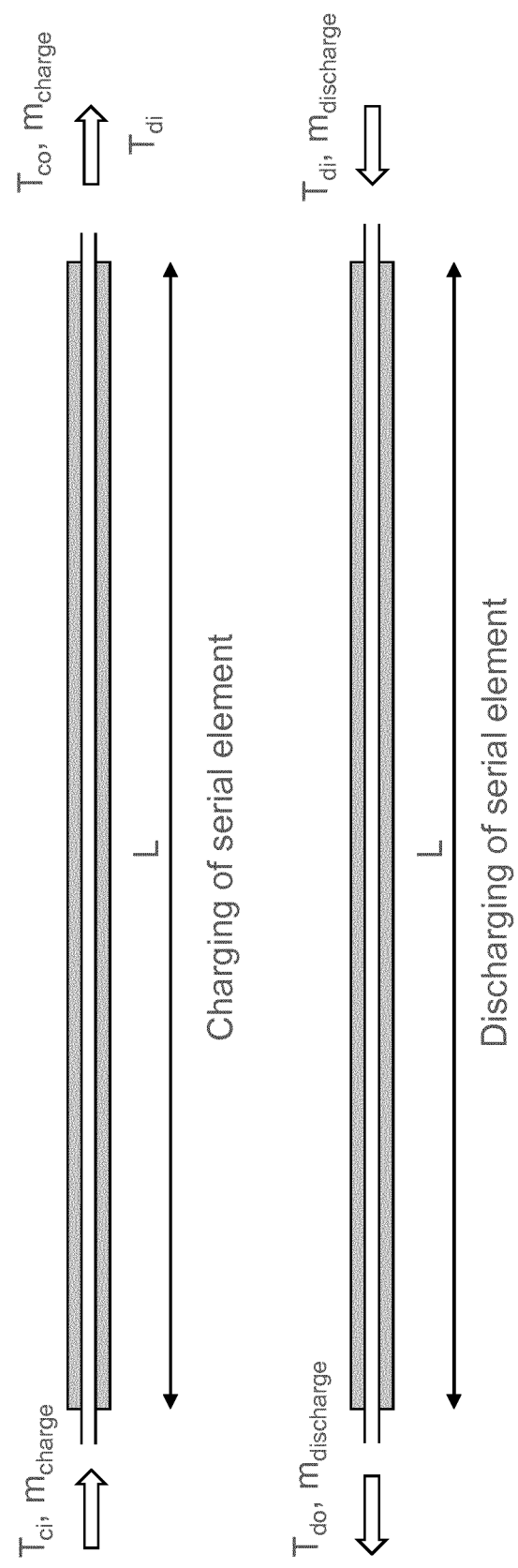

Important motivation and basis for the current invention is illustrated in FIG. 4 and, particularly, FIG. 5. FIG. 4 is a simplified illustration of a serial element, described above, as a representation of many connected elements and parallel flows within a block. Thus, the serial element is one of many equal and parallel components within a block that are operated in the same manner. Since all serial elements in the block are subjected to the same heat transfer fluid condition, analysis of thermal response for the whole block is simply achieved by multiplying the results for a single serial element.

Two operating conditions or operating modes are to be considered, they are the charge phase with delivery of thermal energy to the storage, and the discharge phase with extraction of thermal energy from the storage. In the charge phase the inflow condition for a serial element is defined by the HTF inflow temperature $T_{ci}$ and the mass flow $m_c$ (kg/s). The resulting outflow condition during charge is characterized by the HTF outflow temperature $T_{co}$ while the mass flow, or the flow rate, is generally the same $m_c$ for an incompressible fluid. The HTF flow is normally reversed during discharge of heat with an inflow temperature $T_{di}$ and mass flow $m_d$ and with resulting outflow temperature of $T_{do}$. In some applications, there will be periods of rest in between the charging- and discharging phases. During these intermediary rest phases, the HTF mass flow is zero and hence no interchange of thermal energy between the TES and the external system to which the TES is connected, but there will be some heat transfer within each element itself. The reason for this is simply that the temperature varies both in the transverse direction from the heat exchangers as well as in the length direction, and that temperature gradients results in heat flux and is followed by more even temperature distribution. This effect is normally much more significant in the radial direction normal to the heat exchanger than in the length direction. Resting periods must be included in the calculated time dependent simulation of the thermal performance of the storage elements.

FIG. 5 illustrates aspects of motivation for the current invention. The two axes in the diagram are the length direction (x) of a serial element and the other axis (T) is the temperature of the HTF flowing through the heat exchanger pipe. When charging with an inflow temperature $T_{ci}$ after a discharge cycle, the temperature along the length of the heat exchanger moves upwards from the lower discharge curve in the figure up to the upper curve which indicates the temperature distribution when the charging process is stopped with a maximum outflow temperature of $T_{co,max}$. An intermediate temperature curve for HTF during charge is shown with a dotted line starting from $T_{ci}$. $T_{co,max}$ may be a prescribed maximum temperature for the HTF outflow associated with temperature requirements for the overall HTF loop including maximum return temperature to the heat source.

The "reversed" discharge process starts from the initial condition of the upper curve with discharge inflow temperature of $T_{di}$. The temperature curve along the length of the storage is gradually lowered with time until the discharge process is stopped with a discharge HTF outflow temperature of $T_{do,min}$. An intermediate temperature curve for HTF during discharge is shown with a dotted line starting from $T_{di}$. $T_{do,min}$ may be prescribed value given by requirements by the connected heat sink. For some applications one may assume that the charge inflow temperature $T_{ci}$ and the discharge inflow temperature $T_{di}$ are constant; however, this is not necessarily the case for all applications.

What may stop the charging cycle is that the charging rate decreases when the temperature in the storage medium rises, and subsequently, that the outflow temperature $T_{co,max}$ reaches a maximum in relation to the heating cycle return loop. An example of this is that HTF oil flowing back into a concentrated solar power field must not get too hot simply because this may cause damage to the HTF in the solar energy receptors and the mass-flow must be increased (efficiency of solar field is reduced). Similarly, during heat discharge, the discharge cycle may have to be stopped when the HTF outflow temperature reaches a specified minimum level of $T_{do,min}$. An example of such an imposed limit is that the temperature required for use of the heat in a steam turbine-generator system cannot go below a certain limit due to efficiency and turbine requirements. Alternatively, the mass flow may be decreased to lessen the temperature drop.

When considering FIG. 5 it is seen that the entire serial element could, in principle, be charged to temperature $T_{ci}$ by continuing the charging process long enough in time, see upper line of constant $T_{ci}$. Similarly, the entire serial element could, in principle, be discharged down to the discharge inflow temperature $T_{di}$ by continuing the discharge process long enough. What prevents such utilization is what is already mentioned, a rate of heat transfer that drops more and more, or alternatively, a HTF mass flow that keeps increasing beyond limits imposed by the external system, and that the HTF outflow temperature goes outside acceptable limits in relation to the associated heat source and the heat sink. Clearly, such restrictions imply severe bounds on the utilization and efficiency of the storage.

Regarding storage capacity and utilization, it is seen that the area within the "hysteresis curve" represented by the upper charge temperature curve $T_{max}$ from $T_{ci}$ to $T_{co,max}$ and the lower temperature curve $T_{min}$ from $T_{di}$ to $T_{do,min}$, gives an illustration how much dynamic, thermal energy is stored during one complete, thermal cycle. In somewhat simplified terms, the actual energy stored and discharged during a cycle can be expressed by the formula $$Q_a = \int_0^L \int_{T_{min}}^{T_{max}} q \, dT \, dx \quad (1)$$

q is the heat capacity per unit length and degree for the element (derived from material property and integral over the associated cross section area).

The theoretical, maximum storage capacity is simply the area of the rectangle in the diagram formed by the length L and the difference between $T_{ci}$ and $T_{co}$ $$Q_t = q \, L(T_{ci} - T_{di}) \quad (2)$$

The ratio between the two energy terms expresses a factor that may be termed the storage utilization factor η

$$\eta = \frac{Q_a}{Q_t} \quad (3)$$

This is a theoretical expression of capacity utilization where η less than 1 does not mean that there is any loss of thermal energy as such. This factor will in fact approach 1 if one just keeps on charging and discharging, respectively, long enough. Thus, the utilization factor mainly expresses how much of the theoretical storage potential is being utilized in the actual use case.

The present invention provides a method and system configuration for a modular TES that results in an increased storage utilization factor (increased η) while at the same time satisfying requirements for temperature, mass flow and temperature stability of the HTF outflow during both charge and discharge phases. As will be explained, during such operation specific parts or blocks within the overall storage may preferably go above the prescribed overall HTF outflow temperature limit $T_{co,max}$ during charging at the same time as the combined HTF outflow temperature for the entire storage complies with this requirement. Likewise, during discharge, parts of the storage (blocks) may be allowed to have a HTF discharge temperature that goes below $T_{do,min}$ while the combined HTF outflow temperature for the entire storage complies with this requirement.

DETAILED DESCRIPTION OF THE INVENTION

To explain the invention in further detail, it will be necessary to define some new terms in addition to the block concept that has been introduced earlier:

By a zone is meant a part consisting of one or several blocks within the total storage that is operated in a coordinated charge and discharge cycle which may be different from the rest of the total storage. Charging and discharging in a zone or block is uniformly or coordinated, controllable by regulating one or more valves.

By mixing is meant that HTF flow from two or more blocks or zones are mixed together by way of regulating valves. Mixing, partially or fully, is controllable by regulating one or more valves. Mixing can be made gradually or stepwise over time and takes place within the TES.

By shift is meant that parts of the total storage (a block or a zone) is stepwise engaged or disengaged by way of opening or closing valves, partially or fully. Zones or blocks are coupled inline for flow of HTF, partially or fully, controllable by regulating one or more valves.

By mass flow rate or flow rate is meant the mass flow rate of HTF; kg HTF/second. The mass flow rate is directly proportional to the volumetric flow rate for incompressible liquids, dependent on the HTF specific density, as the skilled person will know.

Some further definitions and clarifications are as follows:

The HTF—Heat Transfer Fluid—is a liquid, a gas or a two-phase liquid-gas. Examples of liquids are thermal oils, water and molten salts. Examples of gases are steam, hydrocarbon gases, exhaust, flue gas and air. Examples of two-phase HTFs are water-steam and hydrocarbon liquid-gas compositions or—fluids.

The temperature limits for HTF flowing into and out from the TES are not governed by the TES itself, which in blocks and zones thereof can and preferably is operated beyond said limits, but by external equipment and systems or the HTF itself. The overall HTF outflow temperature limit $T_{co,max}$ during charging is limited by maximum HTF return temperature for efficient or possible operation of thermal energy source systems. The overall HTF outflow temperature limit $T_{do,max}$ during discharging is limited by maximum HTF temperature limits of external equipment like pumps and turbines. The HTF itself set limits, by boiling or being too hot for source system return. The minimum temperature limits $T_{co,min}$, $T_{do,min}$ are governed by increasing viscosity or solidification of the HTF, and minimum temperature for efficient turbine operation. Connected sources impose limits by maximum HTF delivery temperature and minimum HTF return flow temperature.

The direction of flow of HTF is preferably reversed for charging and discharging if the HTF does not change phase, whereas it may maintain the same direction if the HTF does change phase between liquid and gaseous form. Specifically, if the HTF is thermal oil or other one phase fluid, the flow direction is preferably reversed from charging to discharging. If the HTF is water/steam or other two-phase fluid, the flow direction is not necessarily reversed from charging to discharging. Terminology for inlet and outlets are thereby opposed, for example the charging inlet manifold becomes the discharging outlet manifold. For clarity, usually only the flow direction for charging and the resulting function of structure is used when describing and defining the invention. The skilled person must know that flow directions and terminology usually are opposed from charging to discharging. However, the flow direction for charging and discharging may be the same, and in such situation the terminology is not opposed. An alternative terminology that can replace inlet charging side, outlet charging side, inlet discharging side and outlet discharging side, and corresponding terminology for the TES, the method and use of the invention, are warm side or warmer side, and cold side or colder side, since the TES, unless very long resting or non-active period will have one warm or warmer side and one cold or colder side. More specifically, assuming flow reversing for charging and discharging, inlet charging side and outlet discharging side can be termed warm side or warmer side. And outlet charging side and inlet discharging side can be termed cold side or colder side. For example, inlet charging manifold and inlet pipe can be termed warm side manifold and warm side pipe, respectively, and so on. And the bypass valve is on the warm or warmer side.

Terminology like inlet and outlet are defined with respect to flow direction, usually during charging, unless specifically described. The physical location of inlet side piping and valves is usually on the same physical side of blocks, zones or the whole TES as the outlet side piping and valves, thereby minimizing piping distances and thermal energy loss from piping and valves.

The flow control valve, for control of flow through a block or zone can be in the charging side inlet pipe, alternatively termed the warm or warmer side inlet pipe, or preferably in the outlet charging side pipe or cold or colder side pipe, since the thermal wear is lower due to lower temperature on the cold or colder side.

As will be shown later, operation of the thermal energy storage by way of mixing and shifting between blocks or zones require additional piping and valves beyond what is necessary for operating the entire storage in simple, parallel, synchronous mode. A benefit of the described invention is cost savings since the actual size of the storage can be reduced without reduction of performance, or, alternatively, achieving increased storage capacity without increasing the actual size of the storage. Another benefit is to be able to keep the temperature of the combined outflow from the total storage constant, or within prescribed limits, during both charge and discharge phases.

First Embodiment: Parallel Configuration

Figure 6:
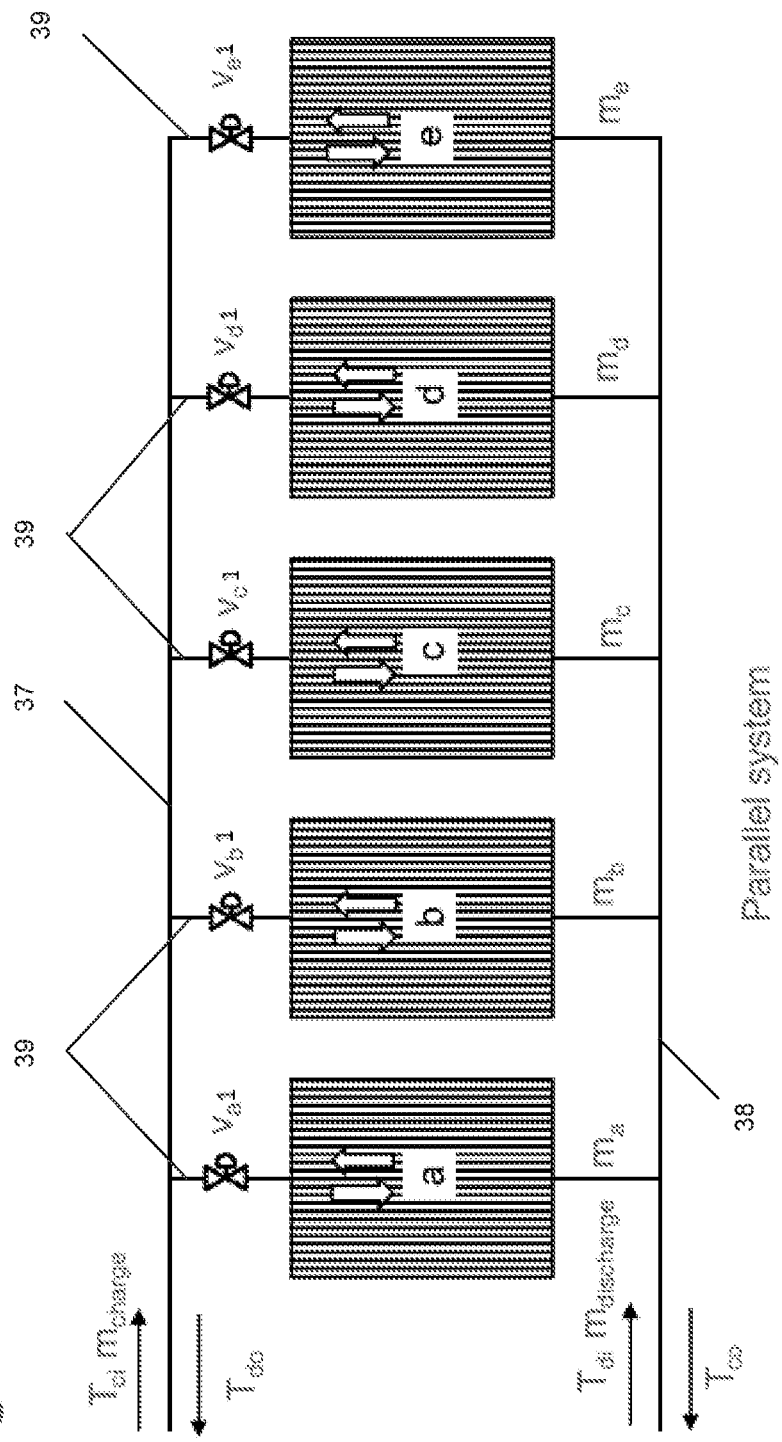
Figure 7:
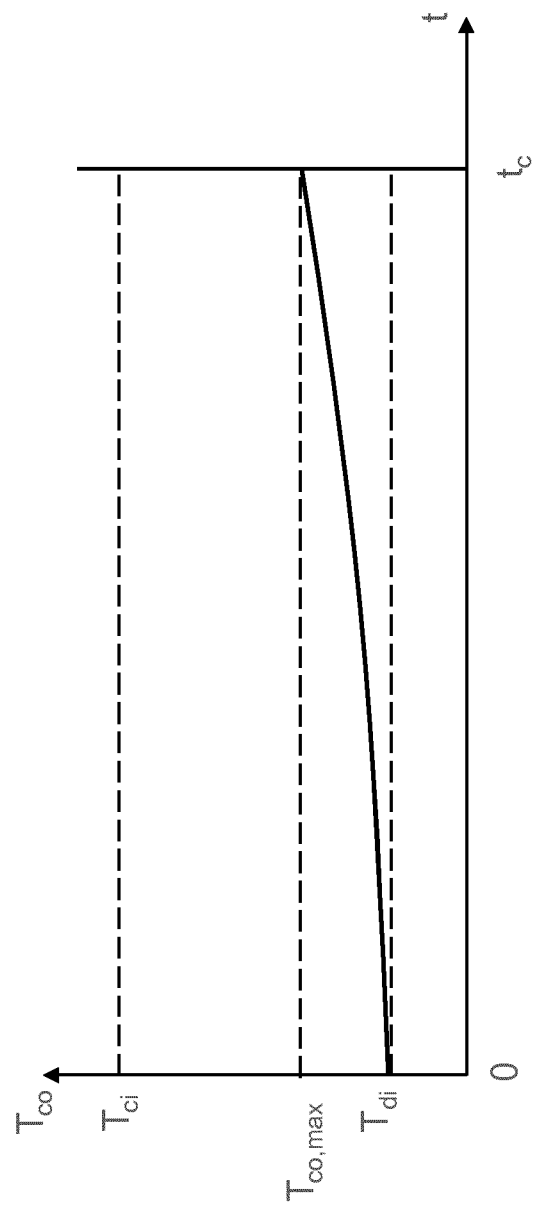
FIG. 7 shows a diagram of the outflow temperature of HTF from the cold end of a block in a parallel system during charging, as function of time. The outflow temperature starts with the previous inflow temperature $T_{di}$ from the discharge phase and increases gradually until the allowable maximum outflow temperature $T_{co,max}$ has been reached.

Two main topological configurations of blocks will now be considered, namely parallel and serial configurations. FIG. 6 is showing, as an example, 5 blocks denoted "a" through "e" in parallel configuration where the HTF flow through each block is controlled by an associated, adjustable valve, $(v_{i1}; v_{a1}, \ldots v_{e1})$. If all valves are open the temperature history in each respective block during charging and discharging will correspond to the curves shown in FIG. 5 where the temperature distribution curve for all blocks moves back and forth between the bottom curve up and the upper curve during thermal cycling. The process has to be discontinued when the outflow temperature reaches a predefined, acceptable maximum of $T_{co,max}$ or $T_{do,min}$ FIG. 7 shows the outflow temperature during charging as a function of time with discontinuation of the process at the time when the outflow temperature reaches its acceptable maximum. As seen, the combined HTF outflow temperature $T_{co}$ increases with time from the minimum $T_{di}$ (the cold end having the previous discharging temperature) up to the maximum HTF outflow temperature $T_{co,max}$ when the charging process is stopped, see also FIG. 5.

Figure 8:
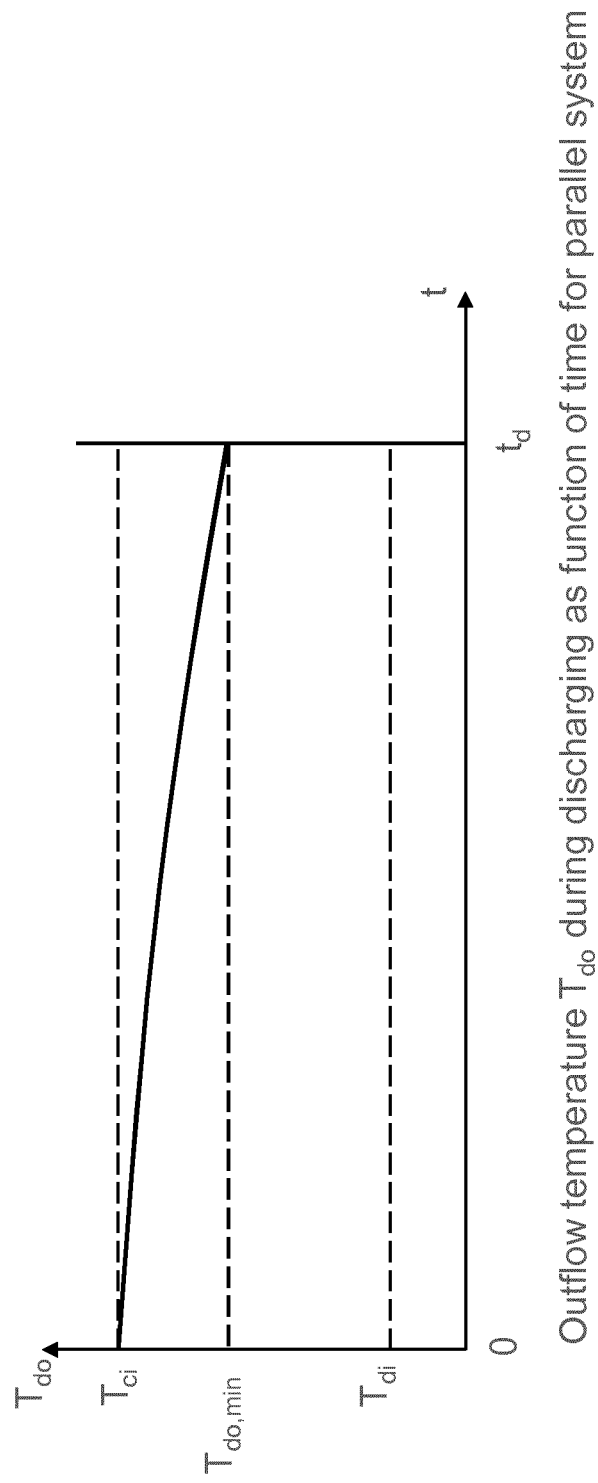
FIG. 8 shows a diagram of the outflow temperature of the heat transfer fluid from the hot end of a block in a parallel system during discharging, as function of time. The outflow temperature starts with the previous inflow temperature $T_{ci}$ from the charge phase and decreases gradually until the allowable minimum outflow temperature $T_{do,min}$ has been reached.

During discharging of heat from the storage, the flow is reversed and the temperature distribution through all storage blocks changes with time from the upper temperature curve, as in FIG. 5, down to the lower temperature curve. The discharge process is stopped when the temperature reaches a defined acceptable minimum $T_{do,min}$ for the outflow. FIG. 8 shows the outflow temperature during discharge as function of time with termination of the discharging when the limit for acceptable HTF outflow temperature has been reached.

It should be noted that the time periods for charging $t_c$ and for discharging $t_d$ do not have to be the same; this depends on the overall system conditions with the heat source and the heat sink. The mass flows $m_{charge}$ and $m_{discharge}$ are also variable parameters that can be different for the two phases and even change with time.

FIG. 6 indicates that each of the blocks in parallel configuration may have its own adjustable valve that controls what share of the total HTF flow will flow through that specific block. Clearly, the flow through one block also depends on the valve settings for the other blocks. As will be shown, the current invention defines a method by which the heating of individual blocks during charging can go beyond the prescribed HTF outflow maximum temperature $T_{co,max}$ while the combined outflow from several simultaneous blocks is kept exactly at the prescribed limit.

FIG. 9 illustrates the method by which this can be achieved. For simplicity, it is assumed that the cold sides of the of all blocks have the same starting temperature $T_{cs}$ at the onset of the heat charging process. During the first phase of the charging process, the HTF mass flow through block "a" and "b" which are in parallel is equal. When the combined outflow temperature reaches $T_{co,max}$, valve $v_a$ is gradually closed while valve $v_c$ is gradually opened resulting in injection of colder fluid from block "c" into the combined HTF flow; in this way the combined outflow temperature is maintained at $T_{co,max}$. At time $t_{c2}$ it is no longer possible to keep this temperature level constant, and valve $v_d$ for the cold block "d" must be engaged while valve $v_b$ for block "b" is gradually closed. At time $t_{c3}$ it is again impossible to keep the combined outflow temperature at the maximum prescribed level, and the cold block "e" must be gradually engaged. By continuing this procedure block $v_c$ is fully closed at time $t_{c4}$ and, finally the total charging process is terminated at time $t_{c5}$ when the outlet temperature from block "e" has reached the prescribed maximum outflow temperature.

It should be noted that there may be alternative ways of carrying out the charging process while still obtaining the advantages of the invention. For instance, the maximum number of simultaneously engaged blocks may be different from 3 as in the example given, and the total number of blocks in the storage may clearly be different from the example described herein using 5 blocks. An example would be having 4 blocks and maximum 2 blocks engaged at one time; this would give the following staged process for the blocks: "a" alone, then "a"+"b", then "b"+"c", then "c"+"d".

A remarkable trait by this method of operation is that large parts of the storage may be heated above the maximum outflow temperature $T_{co,max}$ during charging while the temperature of the combined HTF fluid coming from the storage is kept at this acceptable, or desired, temperature level. Another significant benefit is that the outflow temperature is mostly kept constant which is clearly an advantage for many heat storage application systems.

FIG. 10 shows a similar approach for control of the HTF temperature and enhanced utilization of the storage during thermal energy discharge process. As for the charging example, the number of blocks is 5 and the maximum number of simultaneously engaged blocks is 3. For simplicity, it is assumed that the hot side of all blocks have the same starting temperature $T_{ds}$. In the first phase the flow goes through "a" and "b" in parallel until the combined outflow temperature is reduced to the minimum allowable value $T_{do,min}$ at time $t_{d1}$. At this point block "c" is gradually engaged by opening valve $v_{c1}$ while valve $v_{a1}$ is gradually closed. At time $t_{d2}$ block "a" is fully disengaged while block "d" is gradually engaged. The following steps of "c"+"d"+ "e" and "d"+"e" should be clear from the figure.

Again, the remarkable thing here is that blocks "a", "b", "c" and "d" are being discharged far below the minimum outflow temperature $T_{do,min}$ while the temperature of the combined HTF fluid coming from the storage is kept at this acceptable temperature level. As in the case of charging, another benefit is that the outflow temperature can be kept mostly constant during discharge. Such constant temperature may be an advantage when, for instance, the discharged heat is used for generating steam for a steam turbine under near constant temperature and pressure conditions.

As explained before, the total number of blocks and the maximum number of blocks engaged at simultaneously may be different from what is described in the thermal energy discharge process example above while the method as such remains the same. A further comment is that for parallel configuration it does not matter much from which end the discharging process starts, for the cases shown one may alternatively start on side "e" and progress towards "a", but still with reversed flow direction from the charging process.

The advantages obtained are further illustrated in FIG. 11. The fact that large parts of the storage are heated above the maximum outflow temperature $T_{co,max}$ during charging and below the minimum outflow temperature $T_{do,min}$ during discharging means that the heat storage envelope, previously indicated in FIG. 5, now is being expanded to new levels as shown by additional, vertically shaded areas in FIG. 11. Note that the abscissa is the length direction of combined elements. This simply means that the overall energy capacity for storing heat has been greatly increased while main outflow temperature constraints are still satisfied. It also means that the storage utilization factor $\eta$, defined in equation (3), will increase significantly in value. In practical terms, significantly enhanced, overall performance and cost efficiency of the thermal energy storage will be achieved by use of the invention.

This example with 5 blocks in parallel configuration shown in FIG. 6 can be related to the physical storage exemplification shown FIG. 2 by assuming that the flow of HTF through each of the five stacks can by fully controlled by an associated valve and pipe system; thus, each "stack" becomes a "block". The case discussed here with the flow of up to three blocks being mixed and shifted during charging and discharging can thus be executed according to what is shown in FIGS. 9 and 10. The result will be enhanced overall storage capacity combined with a stable HTF outflow temperature from the thermal energy storage system.

Figure 3:
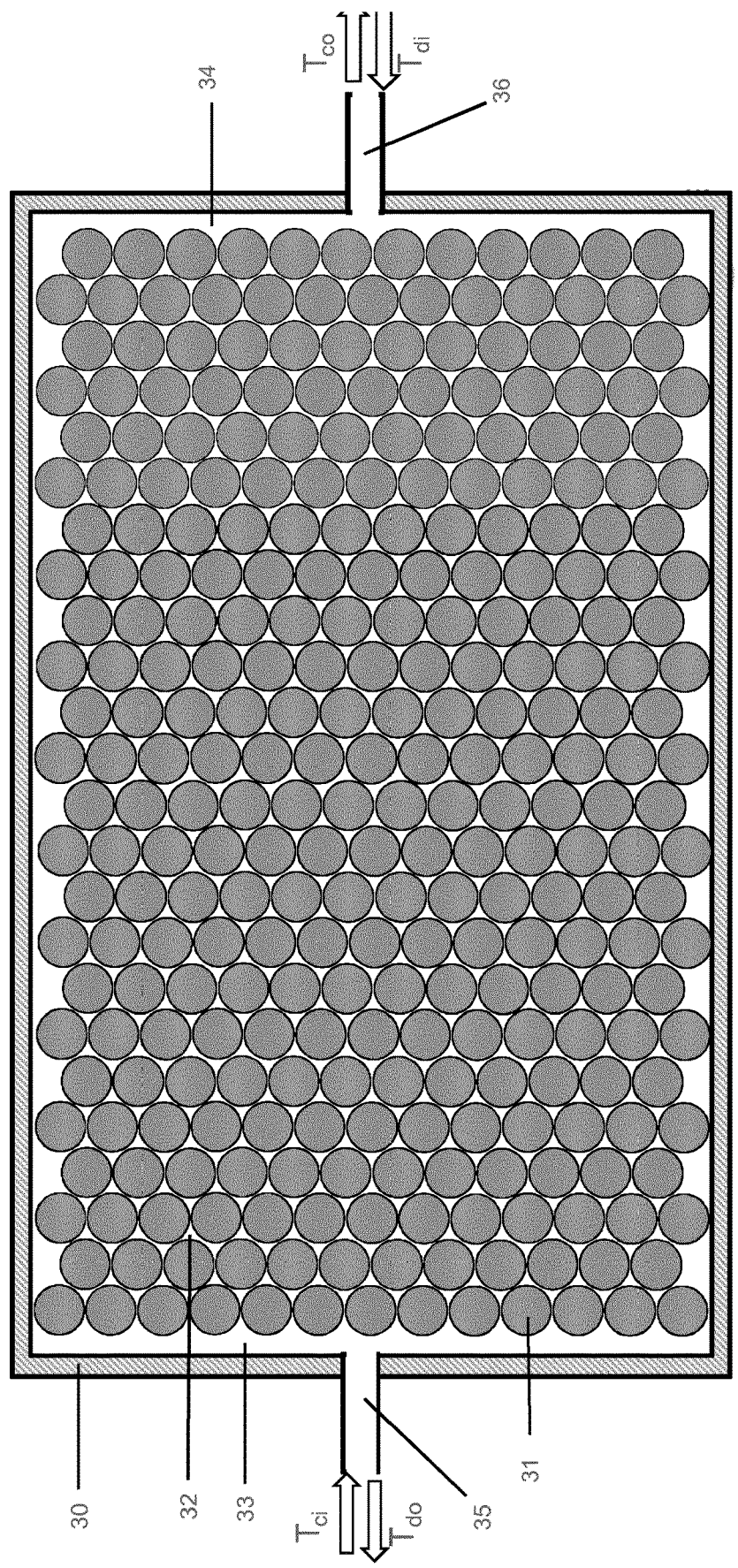

Note that these are selected exemplifications of the current invention. Other applications may include different numbers of blocks (other than five) and with mixing of flow from a different number of blocks (other than up to three) while the principle of enhanced storage performance remains the same. Note also that the innovation does equally well apply to elements that are arranged vertically rather than horizontally, and for other types of TES that can be operated with block control of HTF. Finally, any type of TES being sectioned and controlled by blocks may benefit from use of the method devised by the current invention. Some or all of the HTF flow may be on the outside of the elements as shown for one block in FIG. 3.

Second Embodiment: Serial Configuration

The current invention also includes serial configuration of blocks rather than parallel topology as shown before. However, serial flow topology requires somewhat different pipe connections between blocks and a different placing of adjustable valves per block. This is illustrated for a 5-block system in FIG. 12.

In the simplest case, all bypass valves $v_{i2}$ are closed. This means that during charging the HTF flows through all blocks in sequence until the outflow temperature from the last block reaches $T_{co,max}$. The temperature distribution in the combined length direction then corresponds to the upper hysteresis curve in FIG. 5 which means that the blocks at the end of the flow path will be rather poorly utilized. Similarly, during discharge with reversed flow, the temperature distribution in the total length direction will correspond to the lower hysteresis curve in FIG. 5 with endpoint on the hot side of $T_{do,min}$. This means that the blocks on the left side (a, b, c) will be rather poorly utilized in terms of heat discharge while the blocks in the middle will be best utilized in terms of temperature difference between charged and discharged conditions.

The objective for serially connected blocks is to obtain similar advantages as for parallel configuration, i.e. better overall utilization of the storage. Although there may be room for alternate configuration and piping arrangement, the following example will illustrate the serial methodology relating to FIG. 12. The basic principle is that it is simple to regulate the flow through each block by adjusting the opening of the associated bypass valve. When the bypass valve is fully closed the HTF flow is forced to go through the block. When the bypass valve is fully open the entire HTF flow will fully bypass the block simply because there is significantly higher pressure drop over the block while there is virtually no pressure drop through a fully opened bypass valve. This is also illustrated in FIG. 13 where the degree of opening of bypass valve $v_{i2}$ for block "i" determines how much fluid will run through the block. The fluid pressure before in the trunk pipe (the common pipe) is $p_i$ whereas the reduced pressure after the junction of the block pipe and the bypass pipe (with adjustable valve $v_{i2}$) is $p_{i+1}$. Pressure equilibrium implies that the pressure loss in the block "i" must be exactly the same as the pressure loss through bypass valve "i". When the bypass valve is opened just a little bit the main part of the flow will go through the block because of the chocking action of the valve. When the valve is opened further the pressure drop in the valve will be less and the flow velocity through the block will be reduced to a velocity that that gives the same pressure drop as through the valve. The pressure loss in the block is governed by the Darcy-Weisbach equation $$\Delta p = f_D \rho \frac{v^2}{2} \frac{L}{D} \quad (4)$$

where $\Delta p$ is pressure loss in the pipe, $f_D$ is friction coefficient for the internal surface, v is average fluid velocity through the pipe, L is pipe length and D is pipe diameter. In case of many parallel flows through a block as illustrated in FIG. 2 the pressure loss equation applies to each of the serial elements as shown in FIG. 4.

Notably, the bypass flow regulation is highly nonlinear and quite sensitive to the adjustments of the valve opening (effective mass flow). The control mechanism for the valve setting can be based on measuring the mass flow through bypass pipe and the fluid temperatures through the two branches. How this may be balanced will be explained later.

Considering again FIG. 12, there is, in principle, two ways of operating a such a serial system. The first method is a "binary approach" by which the flow either fully bypasses a block (bypass valve fully open) or the flow goes fully through the block (bypass valve fully closed). This approach is illustrated in FIGS. 14 and 15 for charging and discharging, respectively. The charging process is, for simplicity, assumed to be started with a uniform initial temperature level $T_{cs}$ at the cold side of all blocks. For the first charging step, bypass valve $v_{a2}$ is closed while all other valves are open. This means that the entire HTF flow goes through block "a" until a prescribed maximum HTF temperature $T_{co,max}$ is reached at time $t_{c1}$. At this point in time, bypass valve $v_{b2}$ is closed such that the flow continues from "a" through block "b". When the outflow temperature from "b" reaches $T_{co,max}$ at time $t_{c2}$, valve $v_{a2}$ is opened for full bypass while valve $v_{c2}$ is closed such that the flow goes through "b" and "c". This charging process continues with consecutively engaging and disengaging blocks as seen in FIG. 14.

The corresponding, "binary" discharging process is illustrated from an assumed uniform starting temperature $T_{ds}$ at the hot side of all blocks, see FIG. 15. The HTF flow is fully reversed during discharging such that the HTF first enters into block "e". The HTF flow through block "e" until the outflow temperature has dropped to a lower and acceptable limit $T_{do,min}$ at time $t_{d1}$. At that point in time, the neighbor valve $v_{d2}$ is opened and the flow continues from "e" through block "d". At time $t_{d2}$ the outflow temperature has again dropped to the limit $T_{do,min}$ and the next block "c" has to be engaged by closing $v_{c2}$ and block "a" is disengaged by fully opening $v_{a2}$. The following steps are similar.

The resulting outflow temperature is shown with bold, continuously drawn lines in FIGS. 14 and 15 while intermediate outflow temperatures out of specific blocks are indicated with bold, dashed lines. It is important to note that the majority of blocks can be charged to a temperature level higher than $T_{co,max}$ and discharged to a level lower than $T_{do,min}$ while the serial outflow temperature is being kept between the acceptable limits. This means that, in total, the storage can be charged to a higher temperature and higher energy level than the limit value $T_{co,max}$ should imply and, similarly, discharged to a lower temperature and lower energy level than the $T_{do,min}$ limit value should imply. A result from this approach is that the overall storage capacity will be increased. A disadvantage by this approach is that the outflow temperature is stepwise varying rather much with time rather than being kept stable. To what extent this is undesirable depends on the requirements associated with the heat source and heat sink HTF loops.

As mentioned, and as seen from FIGS. 14 and 15, the "binary" approach has the disadvantage that the outflow HTF temperature varies/jumps every time there is a discrete shift to a new block; this applies both to the charge and the discharge mode. As shown in FIGS. 16 and 17, this problem can be mitigated by continuous adjustment of opening and closing of the bypass valves rather than using only employing the states of being fully opened or fully closed. By example, the charging mode shown in FIG. 16 begins from a state where it is assumed that the cold side of all elements have the same start temperature $T_{cs}$. The first stage starts by closing bypass valves $v_{a2}$ while all other valves are open, thereby charging only blocks "a" and bypassing all other blocks. When the outflow temperature from block "a" at time $t_{c1}$ has reached $T_{co,max}$ action is taken in order not to exceed this temperature limit. This is done by gradually closing (constraining) valve $v_{b2}$ while valve $v_{a2}$ is gradually opened, and letting the flow partially pass outside block "a". The figure shows how the balancing of valves is done such that the combined HTF temperature after block "b" is engaged is kept at the desired level $T_{co,max}$. At time $t_{c2}$ block "a" is fully bypassed while block "b" delivers HTF at the temperature limit. This is the time when the cooler block "c" is gradually engaged while block "b" which is now above $T_{co,max}$ is gradually disengaged while keeping the mixed flow after "c" at the desired temperature limit. The charging process is continued thereafter using the same procedure of shifting and gradual mixing. As for the "binary" process shown in FIG. 14, the result of the mixing strategy is that the major parts of the storage can be charged significantly beyond the temperature limit (see dashed lines). However, the "overcharging effect" may be a bit smaller when using mixing since the actual mass flow through the overcharged block is being reduced rather than kept at full level. Another difference between the two cases is that the total flow resistance for the former case comes from full flow through two blocks while the partial bypassing of the mixing case results in a lower flow resistance.

The corresponding discharge process involving two concurrent blocks in shifting and mixing is shown if FIG. 17. Assuming for simplicity that all blocks have the same hot side starting temperature $T_{ds}$ before discharge, the reversed flow starts with full flow through block "e" until the minimum discharge temperature $T_{do,min}$ has been reached at time $t_{d1}$. At that point in time, the bypass valve $v_{e2}$ for block "e" is gradually being opened while the bypass valve $v_{d2}$ for the neighbor block "d" is gradually being closed. This is done in such a way that the mixed HTF flow after "d" is being kept constant at $T_{do,min}$ while the temperature in block "e" goes below this minimum level. At time $t_{d2}$ the outflow temperature from block "d" has reached the minimum $T_{do,min}$ while block "e" is finally fully bypassed. At that time, block "c" is gradually being engaged while block "d" is gradually being phased out while keeping the combined outflow at the desired level. The process continues to the next neighbor blocks in the same manner until nearly the entire storage has been discharged below the outflow temperature. Clearly, this procedure enables both stable outflow temperature as well as a deep discharge.

It will be possible to increase the amount of charging and discharging even beyond what is shown in FIGS. 16 and 17 by an extended procedure that involves more than two blocks in operation at a given time. There are many ways of configuring serial flows; FIG. 18 is an illustration of a case in which three blocks may be involved simultaneously in charging mode. The principle may seem somewhat complex, and only a short explanation will be provided. During the initial time interval, the HTF flow goes fully and serially through blocks "a" and "b". When the temperature at the junction between b and c reaches the maximum value $T_{co,max}$, then part of the this flow is diverted through the next cold block "c" such that the outcome flow from "b" is mixed with flow from "c" in such a way that the combined fluid temperature at the junction between "c" and "d" keeps the desired level of $T_{co,max}$. At the same time, the flow going through "a" is gradually reduced by opening bypass valve $v_{a2}$. The pressure loss over block "a" is simultaneously reduced. When, at time $t_{c2}$, it is no longer possible to keep outflow temperature $T_{co,max}$ the mixed flow at junction "c-d" is partially diverted through the cold block "d" in such a manner that the mixed outflow at junction "d-e" is kept at this desired temperature level. Block "b" is being gradually bypassed during this sequence to reduce flow resistance. After time $t_{c3}$ the combined flow from junction "d-e" is gradually mixed with flow through block "e" such that the desired outflow temperature is kept. At time $t_{c4}$ the flow goes fully through block "e" and it is no longer required to keep the outflow temperature value. The "parenthesis" about a block name in the figure indicates partial flow through that block. It may be shown that engaging three blocks rather than two allows for higher temperature level during charging. A similar procedure for three blocks during discharge is essentially "the reverse" of what is shown in FIG. 18 and will not be illustrated and explained further.

In the "ultimate" case, all blocks may be serially connected at the same time both for the charging and the discharging modes; this is illustrated in FIGS. 19 and 20 for charging and discharging, respectively. During charging the flow goes first through block "a" till the allowable max temperature $T_{co,max}$ has been reached at time $t_{c1}$. Block "b" is then being engaged by gradually closing bypass valve $v_{b2}$ such that the combined flow temperature after "b" is kept at the desired level. When the maximum outflow temperature has been reached at time $t_{c2}$ block "c" is gradually engaged. This process continues till all blocks have been engaged. The advantage by this process is that a very high, total heat charge can be obtained; in fact, the heating of the first blocks may reach a temperature that is very close to the charging temperature $T_{ci}$ while the combined serial outflow is kept at the much lower, desired temperature $T_{co,max}$. The disadvantage is that the flow resistance increases every time a new block is engaged. It will therefore be necessary to increase the pump pressure accordingly to keep the mass flow constant. Another consideration is that such high degree of energy charging for a given size of storage clearly will increase the charging time; this is simply because the energy content in the HTF inflow is fixed and delivering more energy takes longer time. A different view is that the heat source will provide a given number of hours for charging and that the storage provides the best possible rate of energy absorption (HTF outflow temperature at the limit), thus, the storage can be made smaller and at lower cost simply because the local amount of heat stored in major parts of the storage has been increased (increased beyond $T_{co,max}$).

The corresponding discharging process with sequential engagement of all blocks in a serial manner is illustrated in FIG. 20. The logic of gradually and sequentially closing valves to engage new blocks essentially corresponds to what has been explained above for charging.

The effect of reaching higher storage temperatures than the prescribed maximum $T_{co,max}$ for large parts of the storage during charging essentially means that the upper temperature envelope is moved further up as already shown in FIG. 11. How far this envelope moves upwards depends the end of charging temperatures as indicated in FIGS. 14, 16, 18 and 19 with circles. Similarly, the effect of reaching lower storage temperatures than the prescribed maximum $T_{do,min}$ for large parts of the storage during discharging essentially means that the lower temperature envelope is moved further down as also shown in FIG. 11. How far this envelope moves downwards depends the end of discharging temperatures that are indicated in FIGS. 15, 17, and 20 with circles.

This example with 5 blocks in serial configuration shown in FIG. 12 can be related to the physical storage exemplification shown FIG. 2 by assuming that the flow of HTF through each of the five layers of modules can by fully controlled by an associated valve and pipe system; thus, each "layer of modules" becomes a "block". This means that there will be valves above and below each layer and a bypass pipe and control valve to the side of each layer block while all parallel flows through the modules within one such block will be the equal. The cases discussed here with serially combined flow of two blocks at the same time without bypass mixing as shown in FIGS. 14 and 15 similar flow with bypass mixing as illustrated in FIGS. 16 and 17 and, finally, the gradual, block-wide serial flow mixing shown in FIG. 19 the flow can be executed for the example in FIG. 2. The result of this configuration and operation will be enhanced overall storage capacity, and the possibility to deliver stable HTF outflow temperature from the system during charging, or discharge phases.

Note that these are selected exemplifications of the current invention. Other applications may include different numbers of blocks (other than five) and with mixing of flow from a different number of blocks at the same time while the principle of enhanced storage performance remains the same. Note also that the innovation does equally well apply to elements that are standing vertical rather than being horizontal, and for other types of TES storage that can be operated with block-control of HTF.

Main Embodiment: General, Combined Parallel-Serial System

FIG. 21 shows a configuration of blocks, pipes and valves that enables a choice between an approach with parallel flow with mixing and shift as well as solution with serial flow with mixing and shifting. This particular configuration requires a trunk pipe, also termed manifold, on each side of the set of blocks, with respect to inlet and outlet side of flow, and that each of the blocks has a regulating valve $v_{i1}$ for flow through the block, a regulating valve $v_{i2}$ for bypassing the block, and a switch valve $v_{is}$ that determines whether the block should be connected in parallel mode or in serial mode. FIG. 22 illustrates the principles of two forms of switch valves represented by a pair of opening-closing valves in the one case, and a single, rotational switch valve in the other. Other types of switch valves may equally well be employed. In the context of the present invention, the term "switch valve" is used for a single valve arranged in the outlet pipe and serial return pipe junction, or two or more valves arranged in the outlet pipe and serial return pipe, respectively, the switch valve in any embodiment having the functionality as described.

In parallel mode, all bypass valves $v_{i2}$ are fully open, the flow-through regulating valves $v_{i1}$ are adjusted according to the temperature and time dependent situation of desired flow through the block, while the switch valve is set in parallel flow position that connects the block directly with the trunk pipe on the other side of the block. This corresponds to the valve and pipe system shown in FIG. 6.

In serial mode, all flow-through valves $v_{i1}$ are fully open and the bypass valves $v_{i2}$ are adjusted according to the time dependent situation of desired flow through the block, while the switch valves are set in serial flow position that connects directly with the neighboring block. This corresponds to the valve and pipe system shown in FIG. 12.

By fully exploiting the possibilities of the general system shown in FIG. 21 it will be possible to operate blocks of the storage in parallel mode and other blocks of the storage in serial mode. Another possibility is to run the system in parallel mode during charging and serial mode during discharging; or, vice versa. All considered, the general pipe and valve layout of the invention allows for very much enhanced performance of a thermal energy storage and extreme flexibility in the way it is operated.

Time Zoning

It may be desirable to configure a TES in accordance with a set of different storage needs and time cycles. With the current invention, this may be done in a very simple and flexible manner by operating the storage with several zones where such zone may consist of several blocks. This may be very useful since it may be desirable that the storage should be able to respond to a set of several different time patterns for charging as well as for discharging. For instance, there may be need for weekday 24-hour cycles of charging and discharging while surplus energy from weekends (less energy consumption) may be accumulated during this break and discharged gradually during peak hours of weekdays, implying that the full charge and discharge cycle takes an entire week. Thus, a main part or zone of the storage may be utilized for 24-hour cycles while another zone is reserved for weekly cycles. One may also keep reserve parts of the storage for even longer storage cycles connected with, for example, wind power that typically varies with weather patterns. Further, there may be periods where wind power is extremely cheap and can be used to accumulate a power reserve which later can be used when there is shortage of wind power due to weather conditions.

An example of zoning is illustrated in FIG. 23 which indicates sectioning of the storage into, but not limited to, 24 hours, weekly and reserve time zoning. It is important to note that such division does not have to be fixed and permanent, but can rather be configured according to seasons and dynamic need by use of the flexibility provided by the current invention. This is easily done by way of remote control and opening and closing valves for charging and discharging in accordance with the design shown in FIG. 21. Clearly, there is a choice for applying both parallel and serial configuration in accordance with what serves the situation best. The TES preferably comprises at least one shorter time zone and one longer time zone, preferably at least the shorter time zone comprises control valves, while the longer time zone comprises open-closed valves or control valves.

Instrumentation and Control

A storage according to the invention can be operated in different ways in time and space by setting valves in positions according to purpose. Such settings may be highly dependent on the actual thermal conditions throughout the storage as well as requirements from the heat source and the heat sink. Since such conditions vary with time it is desirable to have full, dynamic control over settings of all valves that regulate the flow. For practical reasons, such settings should preferably be automatically and remotely operated from an operation control center for the thermal energy storage. The process may be governed by an algorithm for optimization of performance. Moreover, various sensors for measuring temperature in the HTF and in the solid materials should be implemented and directly connected with the control facility. Likewise, it should be possible to measure HTF mass flow and, accordingly, regulate pumps to ensure that objectives with respect to charging, storing and discharging energy are met. Such operations may to a large extent be made automatic and be controlled by use of artificial intelligence (AI) programming. Preferably, the sensors operatively coupled to a control system at least comprises a temperature sensor in the charging inlet manifold, a temperature sensor in the charging outlet manifold and at least one temperature sensor in each block or zone. Preferably, at least two temperature sensors are arranged in each block or zone, preferably one at an inlet charging side and one at an outlet charging side of the block or zone, for increased control and redundancy. Preferably, the charging manifold comprises at least two temperature sensors and the discharging outlet manifold comprises at least two temperature sensors, for increased control and redundancy.

Pumps and Pumping

In many embodiments, the pumps of external systems or sources are sufficient for pumping HTF through the TES during charging and discharging of thermal energy, therefore pumps are not defined as an obligatory part of the TES. In other embodiments, particularly with connected sources delivering electric energy, dedicated pumps are preferably arranged to pump HTF through the TES during charging and discharging of thermal energy. In any case, the external or dedicated pumps and/or valves for controlling the overall HTF mass flow rate, are operatively coupled to the temperature sensors and/or the control system used for operation of the TES, wherein the sensors are as a minimum as described under "Instrumentation and control" above.

SUMMARY OF THE TECHNICAL EFFECT OF THE INVENTION

The current invention enables significant improvements in performance and efficiency of sensible heat, thermal energy storage (TES) as compared with ways of utilizing such storage according to prior art. The storage is divided into blocks that are served with a common trunk pipe system for transferring heat by way of heat transfer fluid (HTF) to and from the storage and where the HTF flows through the individual blocks are controlled through a specific system of valves. The HTF can flow through any number of these blocks in a parallel or in a serial manner. Shifting of activation of blocks and mixing of HTF flows with different temperatures are a part of this technology.

The invention enables several very important features that have not been previously described with thermal energy storage:
 a. Parallel flow with shift
 b. Serial flow with shift
 c. Any combination of parallel and serial flow
 d. Keeping a desired outflow temperature from the storage during charging
 e. Keeping a desired outflow temperature from the storage during discharging
 f. Obtaining increased amount of thermal energy charged while still satisfying HTF outflow temperature requirements (d)
 g. Obtaining increased amount of thermal energy discharged while still satisfying HTF outflow temperature requirements (e)
 h. Obtaining constant thermal power with constant HTF mass flow during charging phase, compared with state of the art technology where the mass flow must be increased to maintain constant power.
 i. Obtaining constant thermal power with constant HTF mass flow during discharging phase, compared with state of the art technology where the mass flow must be increased to maintain constant power.
 j. Possibility for zoning of the TES with different cycling objectives and operation modes k. Achieving improved overall safety of the TES due to an extensive system of control valves that can be closed automatically.
 l. Enabling inspections, maintenance and/or repairs, including also drainage of HTF, of one or more parts of the overall TES while other parts are maintained in operation.
 m. Providing up to above 60% improvement with respect to capacity compared to a similar TES with only one inlet/outlet on warm and cold side, respectively, without shifting, mixing, blocks/zones and valves as required for the TES and method of the invention.

The invention claimed is:

1. A thermal energy storage ("TES") comprising:
 at least two blocks or zones operated with respect to charging and discharging of thermal energy by flowing a heat transfer fluid ("HTF") through the block or zone;
 an inlet charging manifold;
 an outlet charging manifold;
 an inlet arranged from the inlet charging manifold to each block or zone;
 an outlet from each block or zone;
 a temperature sensor in the inlet charging manifold;
 a temperature sensor in each of the at least two blocks or zones;
 a temperature sensor in the outlet charging manifold;
 a two-way flow control valve ($v_{i1}$; $v_{a1}$, ... $v_{e1}$) arranged in block or zone inlet pipes for control of flow opening and thereby flow rate through the block or zone, freely operable between a fully closed position and a fully open position and positions in between;
 a two-way flow control bypass valve ($v_{i2}$; $v_{a2}$, ... $v_{e2}$) arranged in the inlet charging manifold between inlet pipe and a serial flow return from the block or zone, freely operable between a fully closed position and a fully open position and positions in between, for control of flow opening between full bypassing flow, mixed bypassing and serial flow, and full serial flow;
 an outlet charging side three-way switch valve ($v_{is}$; $v_{as}$, ... $v_{es}$) arranged in the block or zone outlet pipe, or one two-way valve arranged in the block or zone outlet and one two-way valve arranged in the serial return pipe from the block or zone, for control of serial flow and parallel flow; and
 wherein the temperature sensors and flow control valves are operatively arranged for control of flow through the blocks or zones in serial flow, parallel flow and combinations of serial and parallel flow, by operating the valves to flow heat transfer fluid in serial and/or parallel, by mixing flow from at least two blocks or zones with different HTF outlet temperature for providing a constant HTF outlet temperature as a mixed flow, shifting from higher temperature to lower temperature blocks/zones when charging, and from lower to higher temperate blocks/zones when discharging, delivering constant HTF mixed flow outlet temperature during charging and discharging.

2. The thermal energy storage according to claim 1, comprising at least one block or zone operated in a 24 hours cycle, comprising the two-way flow control valves ($v_{i1}$, $v_{a1}$, $v_{e1}$), the adjustable two-way flow control bypass valves ($v_{i2}$, $v_{a2}$, $v_{e2}$) and the three-way switch valves ($v_{is}$, $v_{as}$, $v_{es}$) arranged in the outlet pipe, and the serial return line arranged from the three-way switch valve to the inlet charging side of a next in serial flow block or zone, for control of serial flow, parallel flow and combinations of serial and parallel flow with the connected serial return line and the outlet pipe for each switch valve, at least one block or zone operated in a weekly cycle, including valves consisting of the two-way flow control valves ($v_{i1}$, $v_{a1}$, $v_{e1}$) and the adjustable two-way flow control bypass valves ($v_{i2}$, $v_{a2}$, $v_{e2}$) with the connected serial return line, and one block or zone operated as a thermal energy long term or seasonal reserve, including valves consisting of either the two-way flow control valves ($v_{i1}$, $v_{a1}$, $v_{e1}$) or the two-way bypass valves ($v_{i2}$, $v_{a2}$, $v_{e2}$) combined with the serial flow return line.

3. The thermal energy storage according to claim 1, wherein the TES is a continuous solid state thermal energy storage in which heat is transferred to and from continuous solid state heat storage elements during charging and discharging by way of the heat transfer fluid ("HTF") that runs through heat exchanger pipes cast into the continuous solid state material heat storage elements, the thermal energy storage is divided into the two or more block units for which the HTF can run from the inlet manifold system on one flow side of the blocks and through the different block units to the outlet manifold system on the other flow side, while the fluid transfers heat to all solid state heat storage elements within the blocks during thermal energy charging, and absorbs heat from all solid state heat storage elements within the blocks during thermal energy discharging, and for the at least two blocks the following is provided:

a. the adjustable two-way flow valve that controls the HTF mass flow rate from a manifold into the block during charging and discharging;
 b. the adjustable two-way flow control bypass valve that controls the HTF mass flow rate bypassing the block during charging and discharging;
 c. the adjustable three-way switch valve that controls the ratio of HTF mass flow rate through the block directly connected with the outlet manifold to the HTF mass flow rate being diverted to the next in serial flow block inlet side;
 by which the at least two blocks can be controlled dynamically such that a desired number of blocks will be engaged in a parallel or in a serial flow pattern, or a combination of these, and through adjustment of the valves the charging and discharging of blocks can be shifted and mixed in time such that the combined, outflowing heat transfer fluid can be kept stable within maximum and minimum temperature bounds, between a maximum HTF discharge outlet temperature $T_{co,max}$ and a minimum HTF discharge outlet temperature $T_{do,min}$, determined by a heat source and a heat sink, while a majority of the block units can be charged and discharged beyond the temperature bounds and thereby increase the overall energy storage capacity.

4. The thermal energy storage according to claim 1, wherein each block comprises a number of thermal storage elements, each of which thermal storage element comprises a steel casing being a combined casting form, reinforcement and HTF fluid leakage retaining barrier, a solid thermal storage medium in the form of concrete that has been cast and hardened into the steel casing, and at least one pipe heat exchanger in the form of a pipe length interval cast into the concrete, an inlet and outlet of the at least one pipe heat exchanger extends out from one end of the steel casing, a number of said thermal storage elements have been arranged in parallel as one block, several blocks have been arranged as stacks or groups of blocks, with the inlet charging manifold, the outlet charging manifold and the further piping and valves, on one side of each stack or group of blocks, and thermal insulation below, on top and around the TES.

5. The thermal energy storage according to claim 1, comprising at least two blocks or two zones operated with respect to charging and discharging of thermal energy by flowing the heat transfer fluid ("HTF") through the blocks or zones, wherein:

at least one block or zone, comprises the two-way flow control valves ($v_{i1}$, $v_{a1}$, $v_{e1}$) and the adjustable two-way flow control bypass valves ($v_{i2}$, $v_{a2}$, $v_{e2}$) freely operable between a fully closed position and a fully open position and position in between, is operated in a shorter term cycle; and at least one block or zone, with valves consisting of the two-way flow control valves ($v_{i1}$, $v_{a1}$, $v_{e1}$) or the two-way flow control bypass valves ($v_{i2}$, $v_{a2}$, $v_{e2}$) with the connected serial flow return line, is operated in a longer term cycle.

6. The thermal energy storage according to claim 1, wherein the blocks or zones comprise continuous solid concrete thermal energy storage material.

7. A method of operating a thermal energy storage ("TES"), wherein the TES comprises at least two blocks or zones operated with respect to charging and discharging of thermal energy by flowing a heat transfer fluid ("HTF") through the block or zone, an inlet charging manifold; an outlet charging manifold, or a combined inlet and outlet charging manifold, an inlet pipe arranged from the inlet charging manifold to each block or zone, an outlet from each block or zone, at least one control valve connected to each block or zone, at least one temperature sensor in each block or zone and each manifold, and piping for mass flow rate control of HTF, the method comprising the following steps:

mixing and shifting flow of HTF, according to temperature, charging and discharging of thermal energy by operating the valves, by mixing flow from at least two blocks or zones with different HTF outlet temperature for providing a constant HTF outlet temperature as a mixed flow, shifting from higher temperature to lower temperature blocks/zones when charging, to not yet charged blocks or zones, and from lower to higher temperate blocks/zones when discharging, to not yet discharged blocks or zones, delivering constant HTF mixed flow outlet temperature during charging and discharging;

wherein each block or zone is operated within a full HTF outlet temperature range of the TES or beyond, wherein the full HTF outlet temperature range is the temperature range between a maximum HTF charge outlet temperature $T_{co,max}$ and a minimum HTF discharge outlet temperature $T_{do,min}$, by shifting which blocks or zones are fluidly coupled for through flow of HTF at maximum temperature difference for maximum heat transfer while mixing HTF for controlling outlet temperature of the HTF, based on input from at least one temperature sensor;

wherein, when operating beyond the full HTF outlet temperature range of the TES, blocks or zones at a charging inlet side of the TES is charged to a temperature that is above the maximum charging HTF outlet temperature $T_{co,max}$ from the TES, downstream blocks or zones are then successively coupled inline for HTF flow for charging to the charging temperature until the whole TES or a part thereof is charged or a maximum HTF charging outlet temperature is reached; and wherein, when operating beyond the full HTF outlet temperature range of the TES, blocks or zones at a discharging inlet side of the TES is discharged to a discharging temperature that is below a minimum discharging HTF outlet temperature $T_{do,min}$ from the TES, downstream blocks or zones are then successively coupled inline for HTF flow for discharging to the discharging temperature until the whole TES or a part thereof is discharged or a minimum HTF discharging outlet temperature is reached.

8. The method according to claim 7, wherein, the flow direction of HTF during discharging is reversed compared to the flow direction of HTF during charging.

9. The method according to claim 7, wherein one or more of the following valves is operated, based on temperature control:
the two-way flow control valves ($v_{i1}$, $v_{a1}$, $v_{e1}$) for control of parallel mass flow rate;
the two-way flow control bypass valves ($v_{i2}$, $v_{a2}$, $v_{e2}$) arranged in an inlet charging side pipe section between inlet pipe and serial flow return for the block or zone, for bypassing mass flow and serial mass flow control; and
outlet charging side three-way switch valves ($v_{is}$, $v_{as}$, $v_{es}$) arranged in an outlet pipe from a block or zone for control of serial mass flow and parallel mass flow, wherein the TES comprises one or both of the pipes: an outlet pipe from a block or zone to the outlet charging manifold, a serial flow return pipe arranged from a block or zone outlet or from a three-way switch valve in the outlet pipe to the inlet charging manifold upstream to a next in serial flow block or zone or downstream to the last in serial flow block or zone.

10. The method according to claim 7, wherein the flow of HTF from blocks or zones are controlled by shifting the flow of HTF from blocks or zones according to temperature, over time during operation, to where the temperature difference between the HTF and the blocks or zones are largest while at the same time delivering HTF out from the TES at a constant temperature during charging and a constant temperature during discharging, by shifting blocks or zones in line for flow, operating one zone at a 24 hours cycle, one zone at a weekly cycle, and one zone as a thermal energy long term or seasonal reserve, the number of blocks in each zone is shifted according to demand.

11. The method according to claim 7, wherein each block comprises a number of thermal energy storage elements, each of which thermal energy storage element comprises a steel casing being a combined casting form, reinforcement and HTF fluid leakage retaining barrier, a solid thermal storage medium in the form of a concrete that has been cast and hardened into the steel casing, and at least one pipe heat exchanger in the form of a pipe length interval embedded or cast into the concrete, an inlet and outlet of the at least one pipe heat exchanger extends out from one end of the steel casing, a number of said elements have been arranged in parallel as one block, several of the blocks have been arranged as stacks or groups of blocks, with the inlet charging manifolds, the outlet charging manifolds and the further piping and valves on one side of each stack or group of blocks, with thermal insulation below, on top and around the TES, whereby the TES is operated from one side of the TES and/or remotely controlled.

12. A thermal energy storage ("TES") consisting of:
at least two blocks or two zones operated with respect to charging and discharging of thermal energy by flowing a heat transfer fluid ("HTF") through the blocks or zones;
an inlet charging manifold and an outlet charging manifold;
an inlet or inlet pipe from the charging manifold to each block or zone;
an outlet or outlet pipe from each block or zone to the outlet charging manifold;
at least one temperature sensor in each of the blocks or zones and at least one temperature sensor upstream the blocks or zones and a temperature sensor downstream to the blocks and zones in the combined inlet and outlet charging manifold; and
a two-way flow control valve ($v_{i1}$; $v_{a1}$, ... $v_{e1}$) arranged in block or zone inlet pipes for control of flow opening and thereby flow rate through the block or zone, freely operable between a fully closed position and a fully open position and positions in between;
wherein the blocks or zones are operatively arranged as a one-dimensional row of blocks or zones between the manifolds;
wherein the temperature sensors and flow control valves are arranged for control of flow through the blocks or zones in parallel flow, by operating the valves to flow heat transfer fluid in parallel, by mixing flow from at least two blocks or zones with different HTF outlet temperature for providing a constant HTF outlet temperature as a mixed flow, shifting from higher temperature to lower temperature blocks/zones when charging, and from lower to higher temperate blocks/zones when discharging, delivering constant HTF mixed flow outlet temperature during charging and discharging;
wherein each block or zone can operate within and beyond a full HTF outlet temperature range of the TES, wherein the full HTF outlet temperature range of the TES is the temperature range between a maximum HTF charge outlet temperature $T_{co,max}$ and a minimum HTF discharge outlet temperature $T_{do,min}$.

13. The thermal energy storage according to claim 12, wherein the blocks or zones include continuous solid concrete thermal energy storage material.

14. A thermal energy storage ("TES") consisting of:
at least two blocks or two zones operated with respect to charging and discharging of thermal energy by flowing a heat transfer fluid ("HTF") through the block or zone; and
one combined charging and discharging manifold;
at least one temperature sensor in each of the blocks or zones and at least one temperature sensor upstream the blocks or zones and a temperature sensor downstream to the blocks and zones in the combined inlet and outlet charging manifold; and
a two-way flow control bypass valve ($v_{i2}$; $v_{a2}$, ... $v_{e2}$) arranged in inlet charging side pipe sections between inlet pipe and serial flow return for the block or zone, freely operable between a fully closed position and a fully open position and positions in between;
wherein the at least two blocks or zones are operatively arranged as a one-dimensional row of blocks or zones between inlet pipe to and a serial flow return pipe from the block or zone on one side of the combined charging and discharging manifold;
wherein the temperature sensors and flow control valves are arranged for control of flow through the blocks or zones in serial flow, by operating the valves to flow heat transfer fluid in serial, by mixing flow from at least two blocks or zones with different HTF outlet temperature for providing a constant HTF outlet temperature as a mixed flow, shifting from higher temperature to lower temperature blocks/zones when charging, and from lower to higher temperate blocks/zones when discharging, delivering an in-substance constant HTF mixed flow outlet temperature during charging and discharging;

wherein each block or zone can operate within and beyond a full HTF outlet temperature range of the TES, wherein the full HTF outlet temperature range of the TES is the temperature range between a maximum HTF charging outlet temperature $T_{co,max}$ from the TES and a minimum HTF discharging outlet temperature $T_{do,min}$, from the TES.

15. The thermal energy storage according to claim 14, wherein the blocks or zones include continuous solid concrete thermal energy storage material.

* * * * *